(12) United States Patent
Midorikawa

(10) Patent No.: US 7,431,340 B2
(45) Date of Patent: Oct. 7, 2008

(54) RESTRICTOR/PROTECTOR OF PASSENGER IN VEHICLE

(75) Inventor: Yukinori Midorikawa, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 406 days.

(21) Appl. No.: 10/543,087

(22) PCT Filed: Jan. 23, 2004

(86) PCT No.: PCT/JP2004/000590

§ 371 (c)(1),
(2), (4) Date: Jul. 22, 2005

(87) PCT Pub. No.: WO2004/065184

PCT Pub. Date: Aug. 5, 2004

(65) Prior Publication Data

US 2006/0097505 A1 May 11, 2006

(30) Foreign Application Priority Data

Jan. 23, 2003 (JP) ............................. 2003-015451

(51) Int. Cl.
*B60R 22/36* (2006.01)
*B60R 22/46* (2006.01)
(52) U.S. Cl. .................. 280/806; 280/802; 280/805; 280/807
(58) Field of Classification Search ............... 280/806, 280/807, 801.1, 802, 805; 242/390.8, 390.9; 180/268
See application file for complete search history.

(56) References Cited

U.S. PATENT DOCUMENTS 4,103,754 A * 8/1978 Ashworth et al. ........... 180/268

(Continued)

FOREIGN PATENT DOCUMENTS

EP          1 122 136          1/2001

(Continued)

OTHER PUBLICATIONS

European Search Report dated Oct. 19, 2006.
Chinese Office Action dated Oct. 13, 2006 with English translation.

*Primary Examiner*—Toan C To
(74) *Attorney, Agent, or Firm*—McGinn IP Law Group, PLLC

(57) ABSTRACT

A main controlling section of a controlling unit (13), when judging a collision risk, drives a motor (12) in a direction of retracting a seat belt (3) and raises tension of the seat belt (3). The main controlling section, when tension of the seat belt (3) reaches a predetermined value, judges that a locking signal is input and has the motor (12) continue retracting driving of the seat belt (3) for a predetermined time and, when a locking signal is not input, decreases a driving power of the motor (12) and lowers tension of the seat belt (3). Even when a collision risk signal is erroneously output from a collision risk judging section (11) and, so long as a locking signal is not output from the locking signal producing section (18), since control is immediately exerted so that tension of the seat belt (3) is lowered, it is possible to avoid an unpleasant feeling to a vehicle occupant (A) caused by comparative long-duration and useless restraining using the seat belt (3).

15 Claims, 21 Drawing Sheets

U.S. PATENT DOCUMENTS

| | | | |
|---|---|---|---|
| 5,744,872 A * | 4/1998 | Cario et al. | 307/10.1 |
| 6,332,629 B1 * | 12/2001 | Midorikawa et al. | 280/806 |
| 6,485,057 B1 * | 11/2002 | Midorikawa et al. | 280/807 |
| 6,729,650 B2 * | 5/2004 | Kawai et al. | 280/807 |
| 6,732,969 B2 * | 5/2004 | Tanji et al. | 242/384.1 |
| 6,817,629 B2 * | 11/2004 | Herberg et al. | 280/801.1 |
| 6,908,112 B2 * | 6/2005 | Yano et al. | 280/805 |
| 7,011,341 B2 * | 3/2006 | Herberg et al. | 280/807 |
| 7,086,625 B2 * | 8/2006 | Schnabl | 242/384 |
| 2002/0024211 A1 | 2/2002 | Yano et al. | |

FOREIGN PATENT DOCUMENTS

| | | |
|---|---|---|
| JP | 50-79024 | 6/1975 |
| JP | 59-21624 | 5/1984 |
| JP | 02-45088 | 11/1990 |
| JP | 11-198760 | 7/1999 |
| JP | 2000-038110 | 2/2000 |
| WO | WO 02/047049 | 6/2002 |

* cited by examiner

RESTRICTOR/PROTECTOR OF PASSENGER IN VEHICLE

TECHNICAL FIELD

The present invention relates to a vehicle occupant restraining and protecting apparatus to restrain an occupant of a vehicle on a seat at time of occurrence of a collision of a vehicle.

BACKGROUND ART

As a belt retracting device (belt retractor) to retract a seat belt used to safely keep a vehicle occupant or a like on a seat, conventionally, an emergency locking-type retractor equipped with an emergency locking-mechanism to automatically lock the retractor by using an inertia detecting means that acts to rapid acceleration, collision or rapid deceleration is used (For example, Japanese Patent Application Laid-open No. Sho 50-79024, Japanese Patent Publication No. Sho 59-21624, and Japanese Utility Model Publication No. Hei 02-45088).

The conventional belt retractor is controlled in a manner in which, for example, when collision is judged as unavoidable, a seat belt (webbing) is reeled by using a motor to raise tension of the seat belt and, after the tension reaches a predetermined level, the tension of the seat belt is lowered.

By controlling as above, for example, even when the judgement that the collision would be unavoidable was not correct and the collision did not occur actually, needless restraining can be avoided and no unpleasant feeling is given to a vehicle occupant.

However, if the belt retractor is so controlled that the tension of the seat belt is lowered immediately after the tension has reached a predetermined level following the rise of the tension of the seat belt, the seat belt is locked for drawing before the tension is restored to its original level reached before the rise in the tension. This is because, when the seat belt is drawn out, the locking mechanism is still kept in a lockable state in which the drawing of a seat-belt is inhibited (for example, in a state in which a condition is being met under which the drawing of seat-belt to be performed when a speed of a vehicle is decelerated at a level exceeding a predetermined one; for example, due to a driver's rapid operation of a brake is locked). Here, there is a problem in that, in such a case as above, it is necessary that the seat belt is reeled again to release the locking of drawing, thus causing a vehicle occupant to be further restrained which gives an unpleasant feeling to a vehicle occupant.

To solve this problem, technology is disclosed in, for example, Japanese Patent Application Laid-open No. Hei 11-198760) in which a belt retractor is controlled in a manner in which, when the collision is judged as unavoidable, a seat belt is reeled to raise a tension of the seat belt and, after the tension of the seat belt reaches a predetermined level, the reeling operations are continued for a predetermined reeling-continuing time (for example, 5 seconds) and, at the best time when the condition for locking the drawing is judged to be not met, the tension of the seat belt is lowered.

However, according to the above conventional technology, in the above reeling-continued time is included time during which the condition for locking of drawing is being met (that is, time during which the locking mechanism is in a lockable state) and, therefore, it is necessary that the reeling continuing time is set to be longer than the time during which the above condition is met.

Additionally, since the time during which the condition for locking of drawing varies depending upon a way of pressing a brake pedal, a speed of a vehicle reached before an operator's rapid operation of a brake, and a way of action of an inertial force to be exerted on a vehicle when collision is avoided by the rapid operation of the brake, in order to avoid an unpleasant feeling that may be given to a vehicle occupant due to a repeated rise in the tension of the seat belt required for releasing the locking described above, it is necessary that the above reeling-continuing time is set to be as long as possible.

As a result, the conventional belt retractor has a problem in that, even when a judgement that collision is unavoidable was not correct and the collision did not occur, a vehicle occupant must endure a pain with being restrained on a seat during a period of the fixed and comparatively long time.

In view of the above, it is an object of the present invention to provide a restraining and protecting apparatus for a vehicle occupant which is capable of avoiding needless and long-time restraining of the vehicle occupant by a seat belt and of not giving an unpleasant feeling to the vehicle occupant.

DISCLOSURE OF THE INVENTION

To solve the above problem, the present invention as set forth in Claim 1 is characterized in that a restraining and protecting apparatus for a vehicle occupant on a seat including a belt adjusting unit to adjust a state in which the vehicle occupant is restrained using a seat belt by increasing or decreasing the seat belt to be drawn out in length, a belt locking mechanism to prevent the seat belt from being drawn out by locking the seat belt, an "immediately before collision" signal producing section to produce and output the "immediately before collision" signal immediately before occurrence of a collision of the vehicle, a locking signal producing section to produce and output a locking signal when it is predicted at least that the belt locking mechanism is in a lockable state where inhibition of drawing out is made possible when the seat belt is going to be drawn out, a controlling section to control the belt adjusting unit based on the "immediately before collision" signal to be input and the locking signal to be input, and wherein the controlling section exerts control in a manner in which, when the "immediately before collision" signal is input, the belt adjusting unit increases the state in which the vehicle occupant is restrained using the seat belt and in which, when the locking signal is not input, the belt adjusting unit weakens the state in which the vehicle occupant is restrained using the seat belt.

Also, the present invention as set forth in Claim 2 is related to the restraining and protecting apparatus for the vehicle occupant as defined in Claim 1 and is characterized in that the belt locking mechanism in the lockable state, when the belt adjusting unit is controlled by the controlling section so as to increase the state in which the vehicle the vehicle occupant is restrained using the seat belt, is put into a state of releasing the locking in which the seat belt is able to be drawn out.

Also, the present invention as set forth in Claim 3 is related to the restraining and protecting apparatus for the vehicle occupant as defined in Claim 1 or Claim 2 and is characterized in that the controlling section exerts control so that, while the locking signal is input, the belt adjusting unit increases and maintains the state in which the vehicle occupant is restrained using the seat belt.

Also, the present invention as set forth in Claim 4 is related to the restraining and protecting apparatus for the vehicle occupant as defined in Claim 3 and is characterized in that the controlling section exerts control so that the belt adjusting unit, when a predetermined time elapses after the locking signal has been input, weakens the state in which the vehicle occupant is restrained using the seat belt.

Also, the present invention as set forth in Claim 5 is related to the restraining and protecting apparatus for the vehicle occupant as defined in any one of Claim 1 to Claim 4, wherein the controlling section exerts control when the "immediately before collision" signal is input so that the belt adjusting unit increases the state in which the vehicle occupant is restrained using the seat belt and that the belt adjusting unit, the state in which the vehicle occupant is restrained to a predetermined extent and when the locking signal is not input, weakens the state in which the vehicle occupant is restrained using the seat belt.

Also, the present invention as set forth in Claim 6 is related to the restraining and protecting apparatus for the vehicle occupant as defined in any one of Claim 1 to Claim 5 and is characterized in that the locking signal producing section outputs the locking signal when at least part of conditions under which drawing of the seat belt is inhibited by the belt locking mechanism is met.

Also, the present invention as set forth in Claim 7 is related to the restraining and protecting apparatus for the vehicle occupant as defined in Claim 6 and is characterized in that the seat belt is locked under condition that acceleration in a back-and-forth or lateral direction of the vehicle exceeds a predetermined value.

Also, the present invention as set forth in Claim 8 is related to the restraining and protecting apparatus for the vehicle occupant as defined in Claim 6 and is characterized in that the seat belt is locked under condition that acceleration at which the seat belt is drawn out exceeds a predetermined value.

Also, the present invention as set forth in Claim 9 is related to the restraining and protecting apparatus for the vehicle occupant as defined in Claim 7 or Claim 8 and is characterized in that the acceleration includes acceleration in a direction being reverse to a direction of a velocity of the vehicle.

Also, the present invention as set forth in Claim 10 is related to the restraining and protecting apparatus for the vehicle occupant as defined in any one of Claim 1 to Claim 5 and is characterized in that the locking signal producing section, when a state in which the belt locking mechanism is in a lockable state is detected, outputs the locking signal.

Also, the present invention as set forth in Claim 11 is related to the restraining and protecting apparatus for the vehicle occupant as defined in any one of Claim 1 to Claim 10 and is characterized in that the belt adjusting unit has a motor to retract the seat belt and that the controlling section, where the "immediately before collision" signal is input, controls the motor to increase its driving power and to increase the state in which the vehicle occupant is restrained using the seat belt and exerts control so that, the belt adjusting unit, when the locking signal is not input, weakens the state in which the vehicle occupant is restrained using the seat belt.

Also, the present invention as set forth in Claim 12 is related to the restraining and protecting apparatus for the vehicle occupant as defined in Claim 11 and is characterized in that the controlling section, while the locking signal is input, controls the motor serving as the belt adjusting unit so as to have the seat belt retracted.

Also, the present invention as set forth in Claim 13 is related to the restraining and protecting apparatus for the vehicle occupant as defined in any one of Claim 1 to Claim 12 and is characterized in that the "immediately before collision" signal producing section, based on a detection signal obtained from a non-contact type distance sensor, calculates a speed of the vehicle relative to an obstruction existing in front of the vehicle and, based on a result from calculation, judges as to whether there is a possibility of occurrence of collision between the vehicle and the obstruction and also judges, when there is the possibility of the collision, as to whether the avoidance of the collision is possible or not Also, the present invention as set forth in Claim 14 is related to the restraining and protecting apparatus for the vehicle occupant as defined in any one of Claim 1 to Claim 13 and is characterized in that the "immediately before collision" signal producing section, when a detection of an operation for collision avoidance is made, outputs the "immediately before collision" signal.

Furthermore, the present invention as set forth in Claim 15 is related to the restraining and protecting apparatus for the vehicle occupant as defined in Claim 14 and is characterized in that the "immediately before collision" signal producing section outputs the "immediately before collision" signal when detection of a rapid brake operation or a rapid handle operation for collision avoidance is made by being recognized that acceleration in a back-and-forth or lateral direction of the vehicle exceeds a predetermined value.

With the configurations of the present invention, even if the collision risk signal is output erroneously from the collision risk judging section, unless the locking signal is output from the locking signal producing section, control is exerted so that the tension of the seat belt is immediately lowered and, therefore, it is possible to avoid occurrence of giving an unpleasant feeling to the vehicle occupant caused by needless restraining for a comparatively long time.

Moreover, even if the locking signal is output from the locking signal producing section, reeling of the seat belt is continued for a predetermined duration time for reeling by the motor even after the tension of the seat belt reaches a predetermined tension and, therefore, when the non-locking signal is output within the reeling continuation time, even if the tension of the seat belt is lowered, drawing of the seat belt is not locked. As a result, it is possible to prevent the occurrence of giving an unpleasant feeling to the vehicle occupant caused by restraining of the vehicle occupant occurring when the seat belt is again reeled to release the drawing locking.

Moreover, unlike in the case of the conventional technology in which the reeling continuation time is set at fixed time including the time at which a condition for locking of drawing is met and, during the fixed time, the driving operation for reeling is continued, in this embodiment, so long as the locking signal is being output from the locking signal producing section, the driving operation for the reeling by the motor is continued and, therefore, a needless rise in the tension of the seat belt can be prevented and wasteful restraining time can be saved.

Also, by stopping the driving operation for reeling to lower the tension of the seat belt after the predetermined reeling continuation time has elapsed, for example, the lockable state occurs in a long steep sloping road and, when the locking signal is output, a state in which the tension of the seat belt is high continues for comparatively long, thus preventing occurrence of giving an unpleasant feeling to the vehicle occupant. Also, it is possible to prevent breakage and/or degradation of the belt adjusting unit caused by long operation for the reeling and to achieve a long life of the belt adjusting unit.

BEST MODE FOR CARRYING OUT THE INVENTION

Hereinafter, embodiments of the present invention are described by referring to drawings. Concrete descriptions are made by using the embodiments.

First Embodiment

Figure 1:
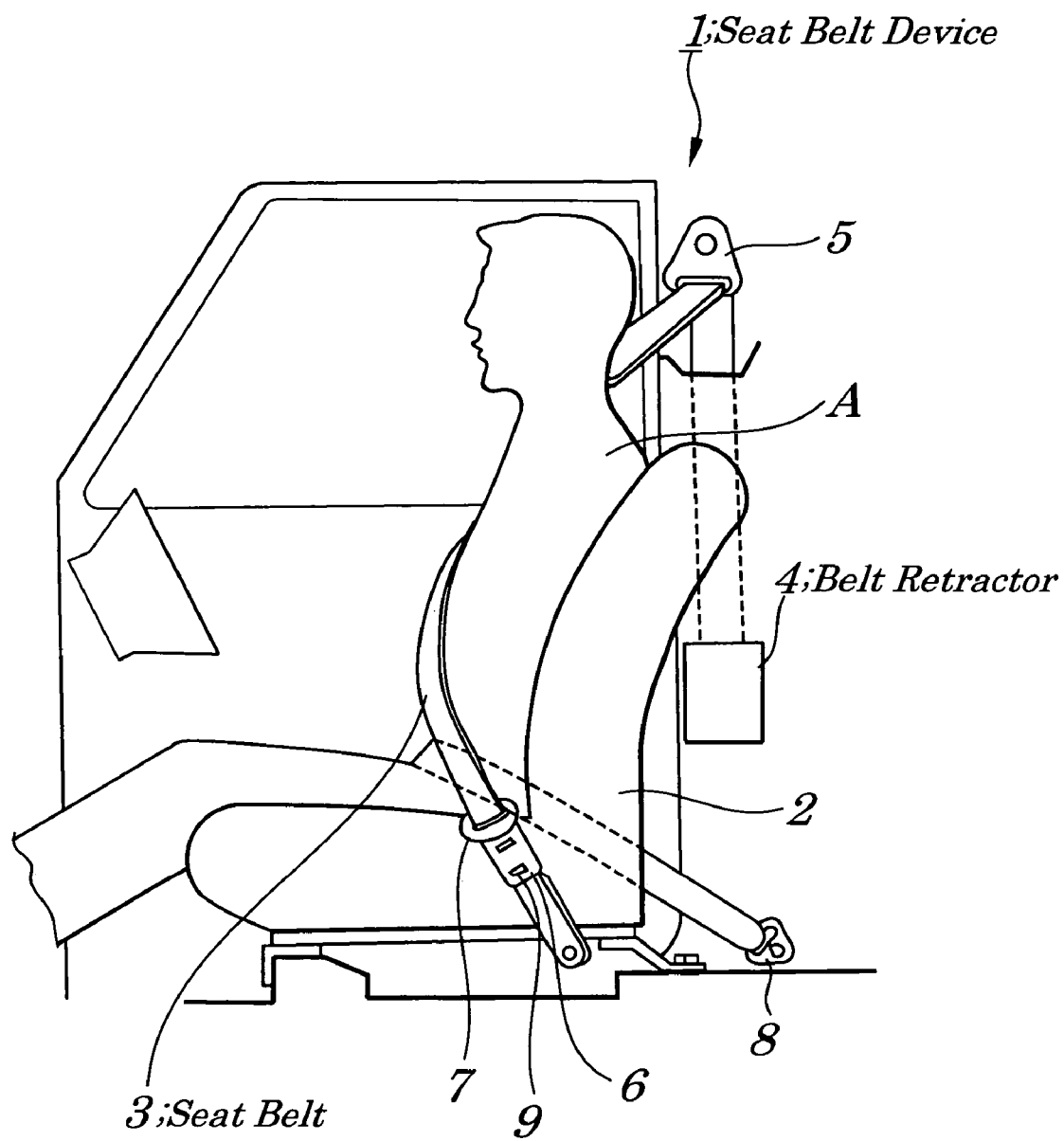
FIG. 1 is a diagram schematically showing configurations of a seat belt device of a first embodiment of the present invention.
Figure 2:
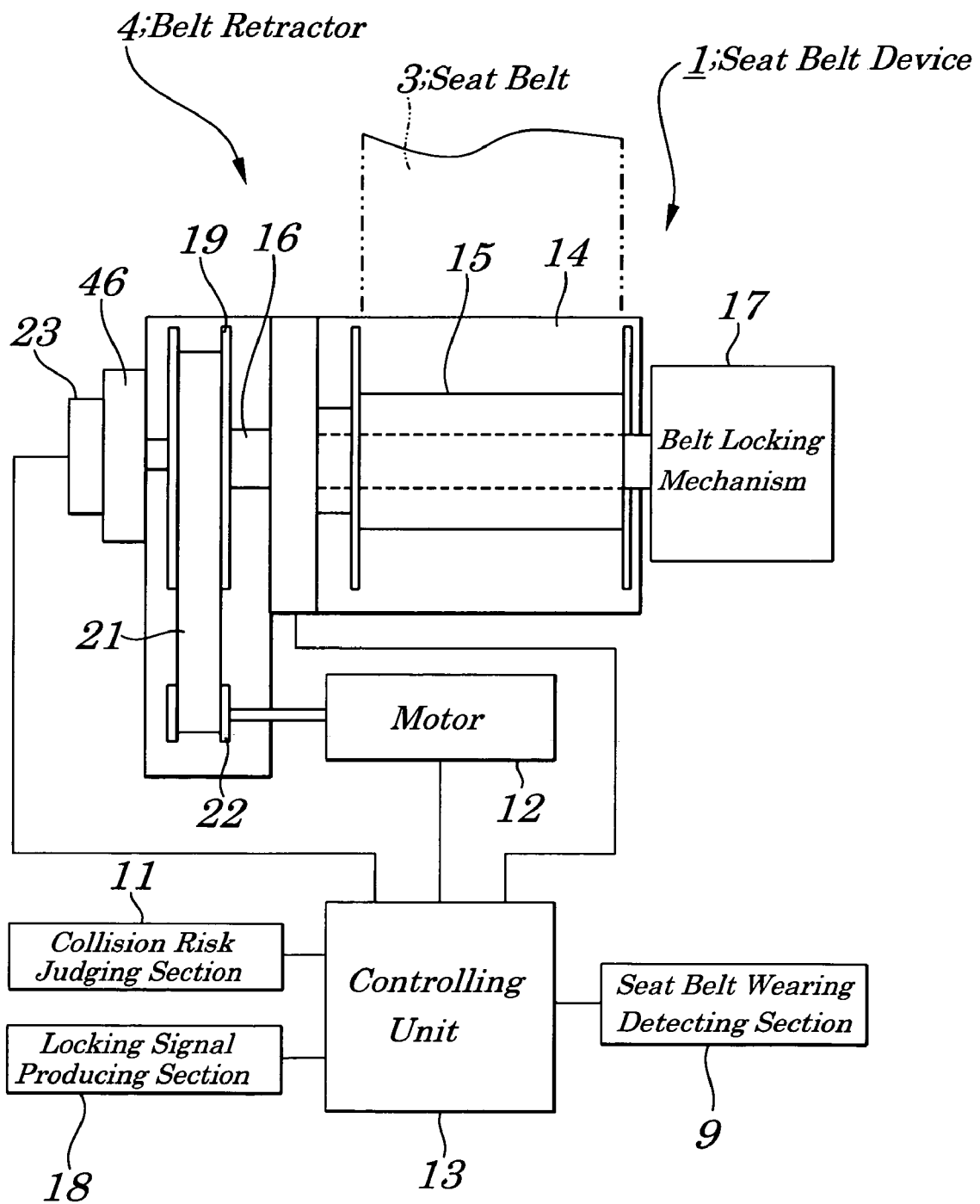
FIG. 2 is a diagram showing configurations of a belt retractor of the seat belt device.
Figure 3:
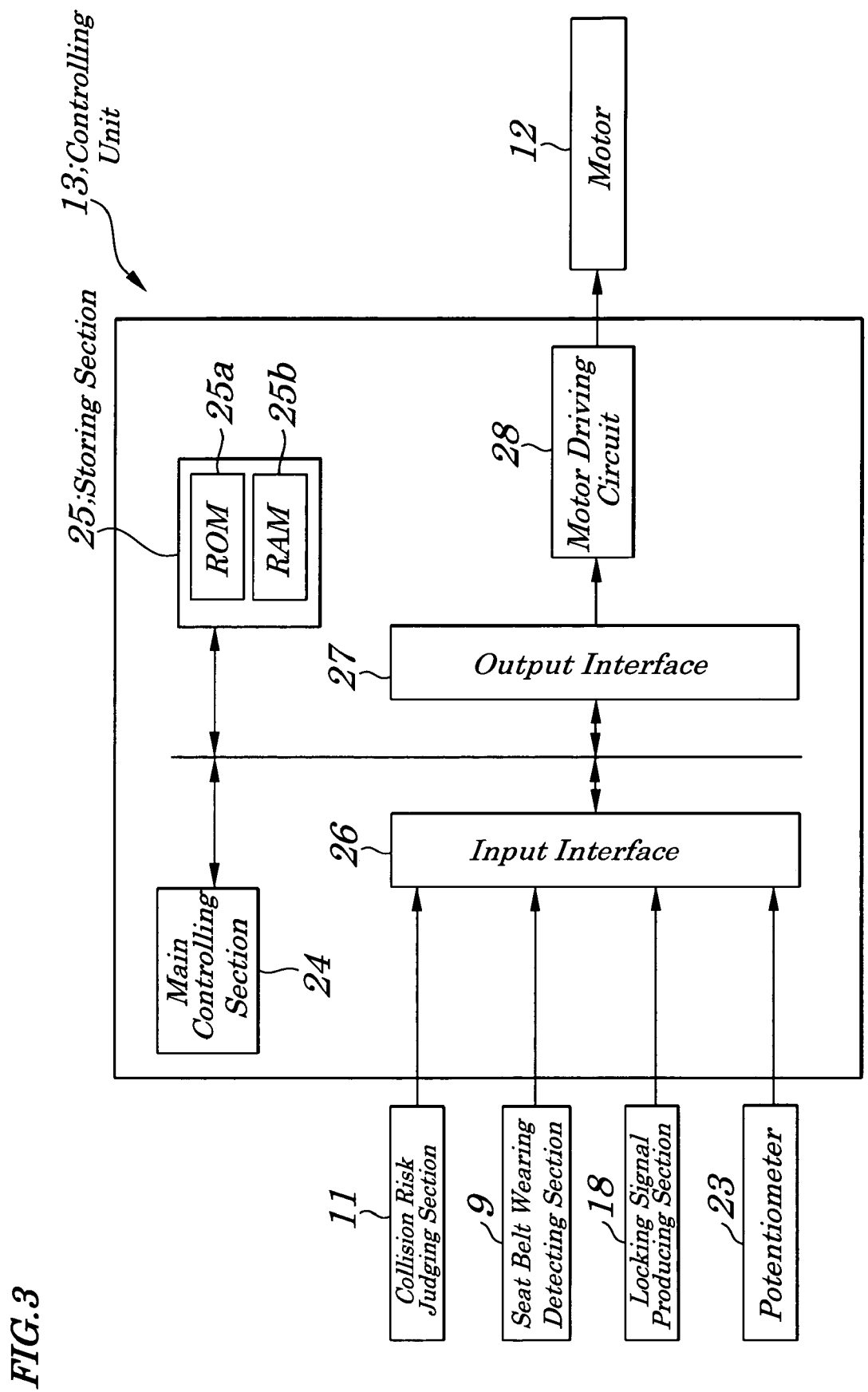
FIG. 3 is a block diagram showing configurations of a controlling unit of the above belt retractor.

FIG. 1 is a diagram schematically showing configurations of a seat belt device 1 of the first embodiment of the present invention. FIG. 2 is a diagram showing configurations of a belt retractor 4 of the seat belt device 1. FIG. 3 is a block diagram showing configurations of a controlling unit 13 of the belt retractor 4.

The seat belt device (restraining and protecting apparatus for vehicle occupants) 1 of the first embodiment, as shown in FIG. 1 to FIG. 13, includes a seat belt (webbing) 3 to restrain a vehicle occupant A on a seat 2 of a vehicle, a belt retractor 4 to reel the seat belt 3, a through anchor 5 to fold the seat belt 3 back in the vicinity of a shoulder of the vehicle occupant, a buckle 6 to be placed on a hip portion of the vehicle occupant A through which the seat belt 3 is fitted, a tongue plate 7 to be connected to the buckle 6 in an associated manner, an anchor 8 to fix an end of the seat belt 3 to a vehicle body, a seat belt wearing detecting section 9 embedded in the buckle 6 to detect wearing of the seat belt 3, and a collision risk judging section ("immediately before collision" signal producing section) 11 to judge the risk of collision or a like of a vehicle.

The belt retractor 4, as shown in FIG. 2, has a controlling unit 13 to control a motor (belt adjusting unit) 12 used to reel the seat belt 3, a reel 15 to wind the seat belt 3 around a frame 14, a reel shaft 16 to be connected to a leftmost end of the reel 15 on which the reel shaft 16 serving as a central shaft for rotation of the reel 15 to be placed in a manner to rotate freely, and a belt locking mechanism (belt locking mechanism) 17 to be placed on a rightmost end of the reel shaft 16 and to be used to lock drawing of the seat belt 3. Moreover, to the controlling unit 13 is electrically connected a locking signal producing section (locking signal producing section) 18 to produce a locking signal and to feed the produced signal to the controlling unit 13 when the belt locking mechanism 17 is in a lockable state in which the seat belt 3 is to be drawn.

The belt locking mechanism 17 has a function (VSI function) to lock drawing of the seat belt 3 when the vehicle is decelerated to a predetermined level or a shock occurs and a function (WSI function) to lock drawing of the seat belt 3 when the seat belt 3 is rapidly drawn at the acceleration exceeding a predetermined level.

Moreover, the belt locking mechanism 17 is so configured that, even in a state in which the drawing of the seat belt 3 is being locked, the seat belt 3 can be reeled by the motor 12.

Also, the belt locking mechanism 17 is so configured that, even after drawing of the seat belt 3 is locked, the locking of drawing is released by operations of reel driving performed by the motor 12.

Also, the reel shaft 16 is a torsional shaft having a function of absorbing energy. That is, if the seat belt 3 is drawn by the belt locking mechanism 17 by strong force with the reel shaft 16 being locked at its right end, plastic deformations of the reel shaft 16 appear in a manner in which the reel shaft 16 itself is distorted around its axis. This allows the seat belt 3 to be drawn out and shock energy acting on a body of the vehicle occupant A to be absorbed by the seat belt 3.

A pulley 19 being fixed to the reel shaft 16 is connected to a pulley 22 fixed to a shaft of the motor 12 via a power transfer belt (timing belt) 21. In portions externally surrounding the pulleys 19 and 22 are formed a predetermined number of external teeth respectively and also at the inner radius of the power transfer belt 21 is formed a predetermined number of internal teeth.

Each of the teeth of the pulley 19 of the reel shaft 16, and the pulley 22 of the motor 12 engage in the power transfer belt 21 in proper quantities and the rotation of the motor 12 is transferred to the reel shaft 16.

The motor 12 is fixed to the frame 14 at, at least, in two points and operates according to an instruction signal of the controlling unit 13.

Figure 5:
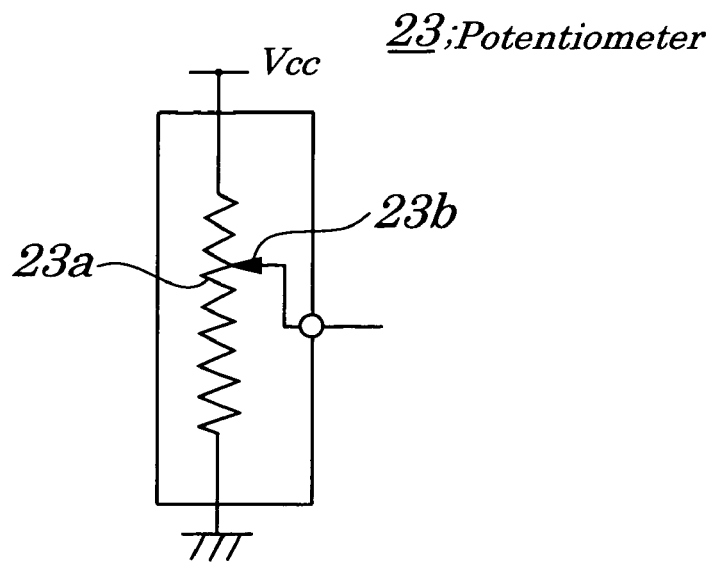
FIG. 5 is a circuit diagram showing configurations of a potentiometer of the above belt retractor.

FIG. 5 is a circuit diagram showing configurations of a potentiometer 23 of the belt retractor 4. The potentiometer 23 placed at the leftmost end of the reel shaft 16, as shown in FIG. 5, includes a resistor 23a, to both ends of which a voltage is applied, and a slider 23b that rotates in synchronization with rotation of the reel shaft 16 and outputs a voltage corresponding to amounts of the rotation relative to a reference position of the reel shaft 16 to the controlling unit 13.

By configuring as above, for example, amounts of drawing of the seat belt 3 can be estimated. It is possible to estimate an amount of looseness of the seat belt 3 by comparing a voltage value in a state in which the seat belt 3 has no looseness with a voltage value in a state in which the seat belt 3 is drawn out.

The controlling unit 13, as shown in FIG. 3, includes a microcomputer system which has a main controlling section (controlling section) 24 made up of a CPU (Central Processing Unit), a storing section 25 made up of a ROM (Read Only Memory) 25a, RAM (Random Access Memory) 25b, or alike, an input interface 26, an output interface 27, and a motor driving circuit 28 to drive the motor 12.

The main controlling section 24 loads, for example, a control program or data stored in the ROM 25a in a working area of the RAM 25b and controls operations of the motor 12.

The collision risk judging section 11 is mounted to judge whether there is a risk of collision with an obstacle such as a vehicle existing in a forward direction or whether the collision is avoidable or unavoidable and to detect to confirm whether or not collision avoidance operations including a driver's rapid brake operation or rapid handle operation are performed.

The collision risk judging section 11 measures a distance between the vehicle and the obstacle for every specified time by using a non-contact type distance sensor such as a laser radar, ultrasonic sensor, or a like and calculates a relative speed based on a time change of the distance. Then, by dividing the distance by the obtained relative speed, time before the collision is computed.

The collision risk judging section 11 judges, when the time of the occurrence of the collision is within predetermined specified time, that there is a risk of collision and outputs a collision risk signal ("immediately before collision" signal).

The collision risk judging section 11, when detecting that collision avoidance operations including a driver's rapid brake operation, rapid handle operation, or a like are performed, outputs a collision risk signal.

Figure 4:
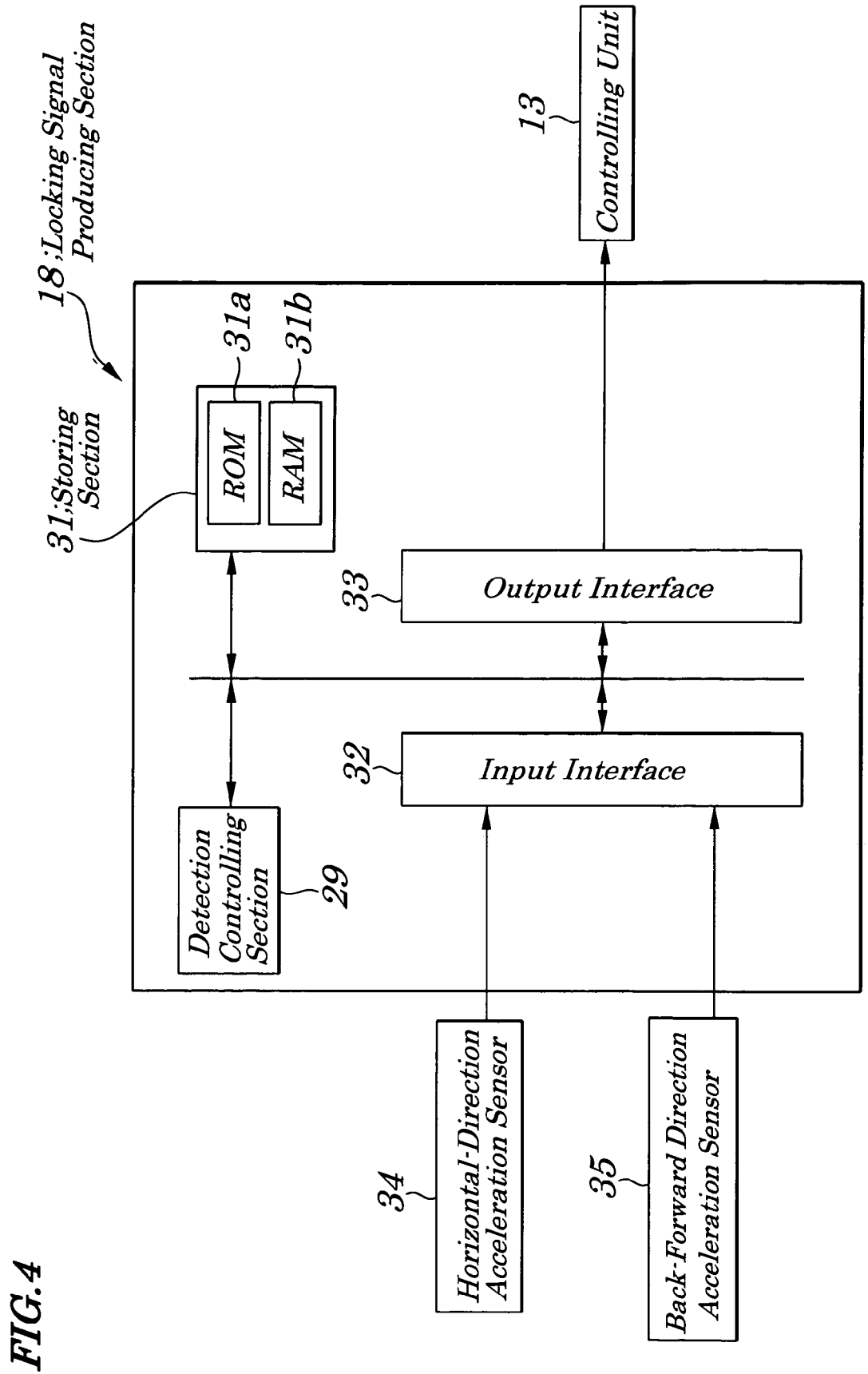
FIG. 4 is a block diagram showing configurations of a locking signal producing section of the above belt retractor.

FIG. 4 is a block diagram showing configurations of the locking signal producing section (locking signal producing section) 18 of the belt retractor 4. The locking signal producing section 18, as shown in FIG. 4, is made up of a microcomputer system which has a detection controlling section 29 made up of a CPU, a storing section 31 made up of a ROM 31a, RAM 31b, or a like, an input interface 32, and an output interface 33.

To the locking signal producing section 18 is connected a horizontal-direction acceleration sensor 34 to detect acceleration Gx in a horizontal direction out of acceleration of a vehicle body and back-forward direction acceleration sensor 35 and the detection controlling section 29 to detect acceleration Gy in a back-forward direction out of the acceleration of the vehicle body receives information about acceleration supplied from the horizontal-direction acceleration sensor 34 and the back-forward direction acceleration sensor 35 and, after calculating absolute values |Gx| and |Gy| of the acceleration Gx and Gy based on the acceleration Gx and Gy, calculates time averages Gxa and Gya of a predetermined time (for example, 2 ms) absolute values |Gx| and |Gy| of the acceleration Gx and Gy, and outputs a locking-signal non-detected signal or a locking-signal detected signal based on threshold values Gxt and Gyt of a predetermined acceleration.

That is, the detection controlling section 29, when Gxa<Gxt and Gya<Gyt, outputs a locking-signal non-detected signal and outputs a locking signal in cases other than the above.

Moreover, in the above embodiment, the threshold values Gxt and Gyt of the acceleration are determined in advance in a manner to correspond to operational conditions of a vehicle body acceleration detecting section.

The detection controlling section 29 loads, for example, a controlling program and/or data stored in the ROM 31a in a working area of the ROM 31b, calculates, for example, time averages Gxa and Gya of absolute values of acceleration Gx and Gy, produces a locking-signal non-detected signal and a locking-signal, and feeds the produced signals to the controlling unit 13.

The program stored in the ROM 31a includes an acceleration calculating program to calculate the above-described time averages Gxa and Gya and a judging program to judge which was output, the locking-signal non-detected signal, the locking-signal, or a like.

In the controlling unit 13, by using an output from the seat belt wearing section 9, setting of a flag in a flag area placed in the RAM 25b is done through the input interface 26.

Also, in the controlling unit 13, when a collision risk signal is fed from the collision risk judging section 11 to the input interface 26, a "collision risk flag" installed in the RAM 25B is turned ON. This causes the main controlling section 24 to start interruption process.

Also, in the controlling unit 13, when a locking-signal is input from the locking-signal producing section 18 to the input interface 26, a "locking flag" in the flag area installed in the RAM 25b is turned ON. Also, when a non-locking signal is input, the "locking flag" is turned OFF.

Also, in the controlling unit 13, a voltage output from the potentiometer 23 is A-D (Analog to Digital) converted by the input interface 26 in a predetermined period. The input interface 26 in which a CPU is embedded monitors the converted output voltage data.

For example, a rotational state of the reel shaft 16 is judged based on a difference between a previous value and a present value of the output voltage data and a drawing flag of the seat belt 3 or a reeling flag of the seat belt 3 is set in the flag area of the RAM 25b based on whether the difference between the previous value and present value of the output voltage is positive or negative.

Alternatively, by operations of a DMA (Direct Memory Access), output voltage data is written in an area in which a rotational amount is stored. A change in a drawing direction appearing when the seat belt 3 has been reeled corresponds to looseness of the seat belt 3. This amount of looseness of the seat belt 3 is written in an area in which a belt looseness is stored.

Moreover, in the controlling unit 13, a current value flowing through the motor 12 is detected by a current detector installed in the motor driving circuit 28 as a voltage value corresponding to the current. This voltage value is A/D converted in a predetermined period in the input interface 26 and is written in an area in which a motor current is stored in the RAM 25b by operations of the DMA. Since a current of the motor 12 is related to rotational torque of the motor 12, the rotational torque can be estimated by the current value loaded thereon. The rotational torque of the motor 12 serves as drawing force of the seat belt 3. The main controlling section 24, when a predetermined condition set in the control program is met, feeds an instruction for normal rotation of the motor 12, an instruction for reverse rotation, and an instruction for stopping of driving to the output interface 27.

The output interface 27 produces a gate signal corresponding to these instructions and supplies these instructions to the motor driving circuit 28. In the case of normal rotation of the motor 12, G1 and G2 are set to be "H" and "L" respectively.

In the case of reverse rotation, the G1 and G2 are set to be "L" and "H" respectively. In the case of the stopping of driving of the motor 12, the G1 and G2 are set to be "L" and "L".

Figure 6:
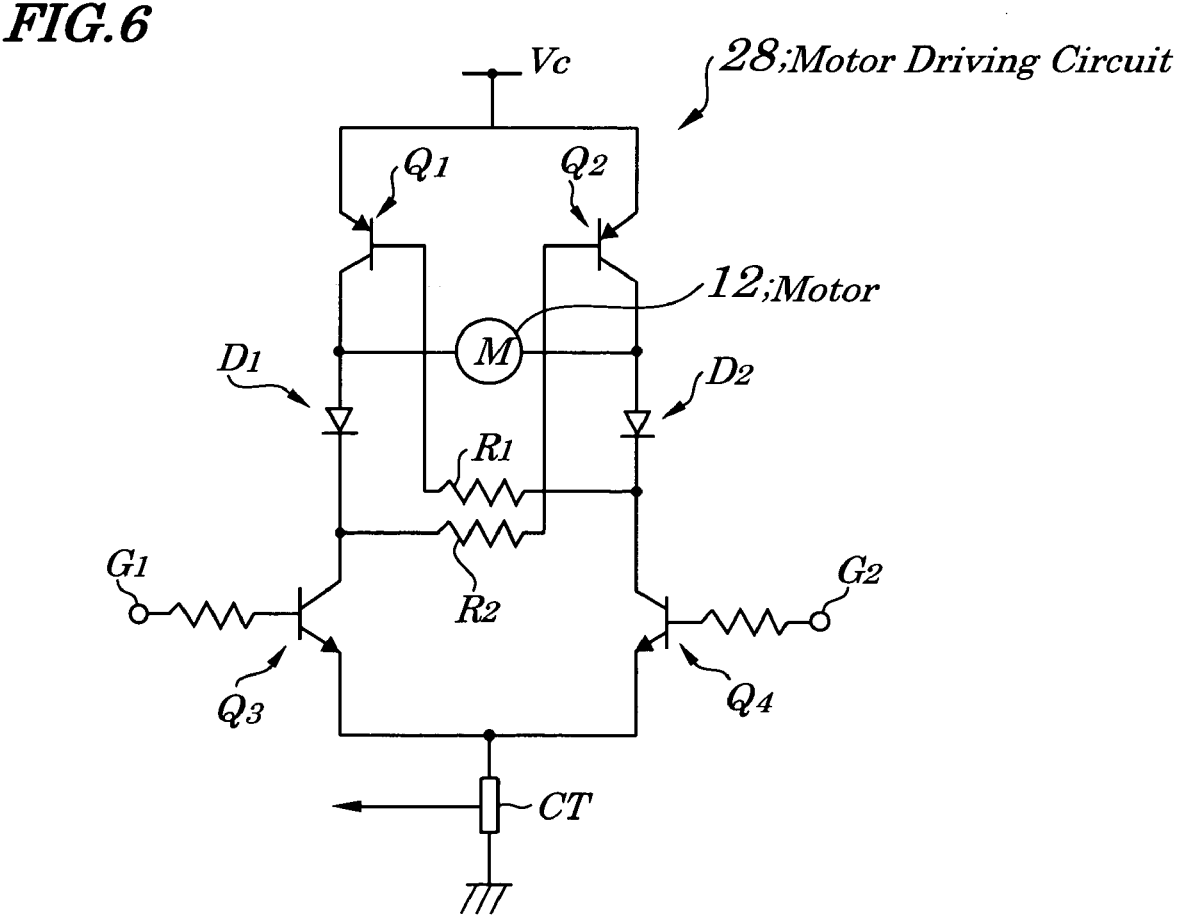
FIG. 6 is a circuit diagram showing configurations of a motor driving circuit of the above belt retractor.

FIG. 6 is a circuit diagram showing configurations of the motor driving circuit 28 of the controlling unit 13. The motor driving circuit 28, as shown in FIG. 6, is a transistor bridge circuit made up of four transistors including PNP-type transistors Q1 and Q2 and NPN-type transistors Q3 and Q4.

Emitters of the transistors Q1 and Q2 are connected to each other and a supply power Vc is fed to a connection point. Emitters of the transistors Q3 and Q4 are connected to each other and a ground potential is fed to the connection point. A level of each of output currents from the transistors Q3 and Q4 is detected by a current detector CT and, as a result, a level detection signal is transmitted to the input interface 26. The level detection signal is A/D converted by the input interface 26 and is written in an area in which a belt tension is stored in the RAM 25b by operations of the DMA. A load current value flowing through the motor 12 is related to torque and, therefore, a tension of the seat belt 3 can be estimated from this.

Collectors of the transistor Q1 and Q2 are connected to each other via a diode D1. The collectors of the transistors Q2 and Q3 are connected to each other via the diode D2. A base of the transistor Q1 is connected to a collector of the transistor Q4 via a bias resistor R1. A base of the transistor Q2 is connected to the collector of the transistor Q3 via the bias resistor R2. The motor 12 is connected between the collectors of the transistors Q1 and Q2.

In the motor driving circuit 28, when an instruction for normal rotation of the motor 12 is fed to each gate of the transistors Q3 and Q4 from the input interface 33, the transistor Q3 is brought into conduction and the transistor Q4 is brought into non-conduction. The collector of the transistor Q3 is put into a ground level and operates to bias a base of the transistor Q2 through the resistor R2 to make the base be at a low level (approximately ground level) and the transistor Q2 be brought into conduction. The collector of the transistor Q4 is changed approximately to be a level of supply power and makes a base of the transistor Q2 become high in potential level and makes the transistor Q1 be brought into conduction. As a result, a forward-direction current path is formed in paths of the power source Vc, transistor Q2, motor 12, diode D1, transistor Q3, and the ground, and the motor 12 rotates in a direction in which the seat belt 3 is reeled.

When an instruction for reverse rotation is fed to each of gates of the transistors Q3 and Q4 from the output interface 27, the transistor Q3 is brought into non-conduction and the transistor Q4 is brought into conduction.

The collector of the transistor Q4 is changed to be at a ground level by being brought into conduction and biases, through the resistor R1, the base of the transistor Q1 so as to be at a low level, thus making the transistor Q1 be brought into conduction. The collector of the transistor Q3 is changed to be approximately at a supply source level and biases, through the resistor R1, the base of the transistor Q2 to be at a high level, thus making the transistor Q2 be brought into conduction.

As a result, a forward-direction current path is formed in paths of the supply power source Vc, transistor Q1, motor 12, diode D2, transistor Q3, and ground, and the motor 12 rotates in a direction of drawing out the seat belt 3.

A supply of a driving stop instruction signal fed from the output interface 27 to each gate of the transistors Q3 and Q4 makes both the transistors Q3 and Q4 be brought into non-conduction. When the transistor Q3 is changed from its conduction state to its non-conduction state, the level of the collector of the transistor Q3 is raised from its ground level to its supply power level and the base of the transistor Q1 is biased to be at a high potential and the transistor Q2 is driven into cutoff. Similarly, when the transistor Q4 is changed from its ground level to its supply power level and the base of the transistor Q2 is biased to be at a high potential, the transistor Q12 is driven into cutoff. Thus, when the driving stop instruction is supplied, each transistor making up the bridge is brought into non-conduction.

Next, by referring to FIG. 7 to FIG. 15, mechanical configurations of the belt retractor 4 of the embodiment are described.

Figure 7:
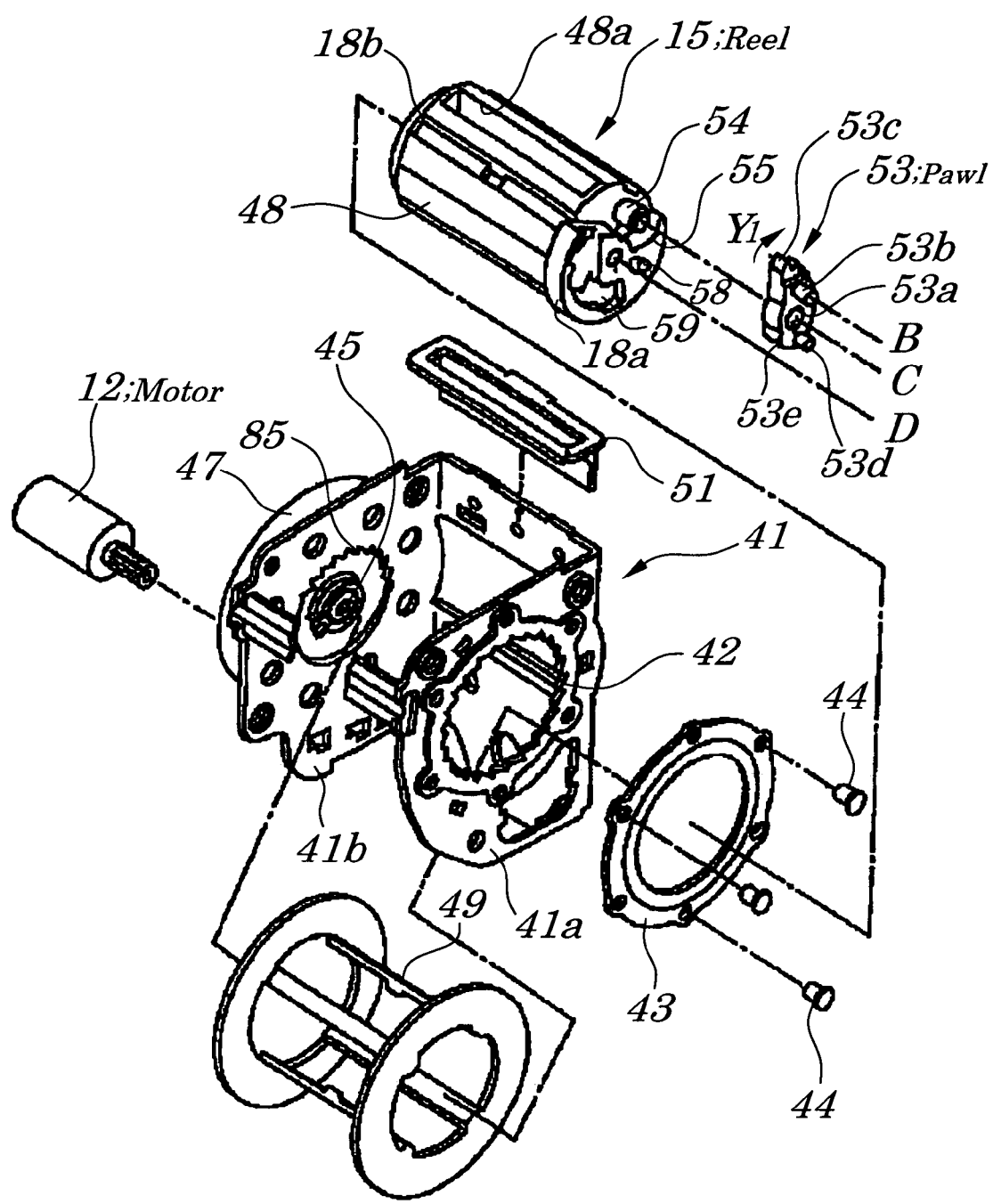
FIG. 7 is an expanded perspective view showing a part of the configurations of the above belt retractor.
Figure 8:
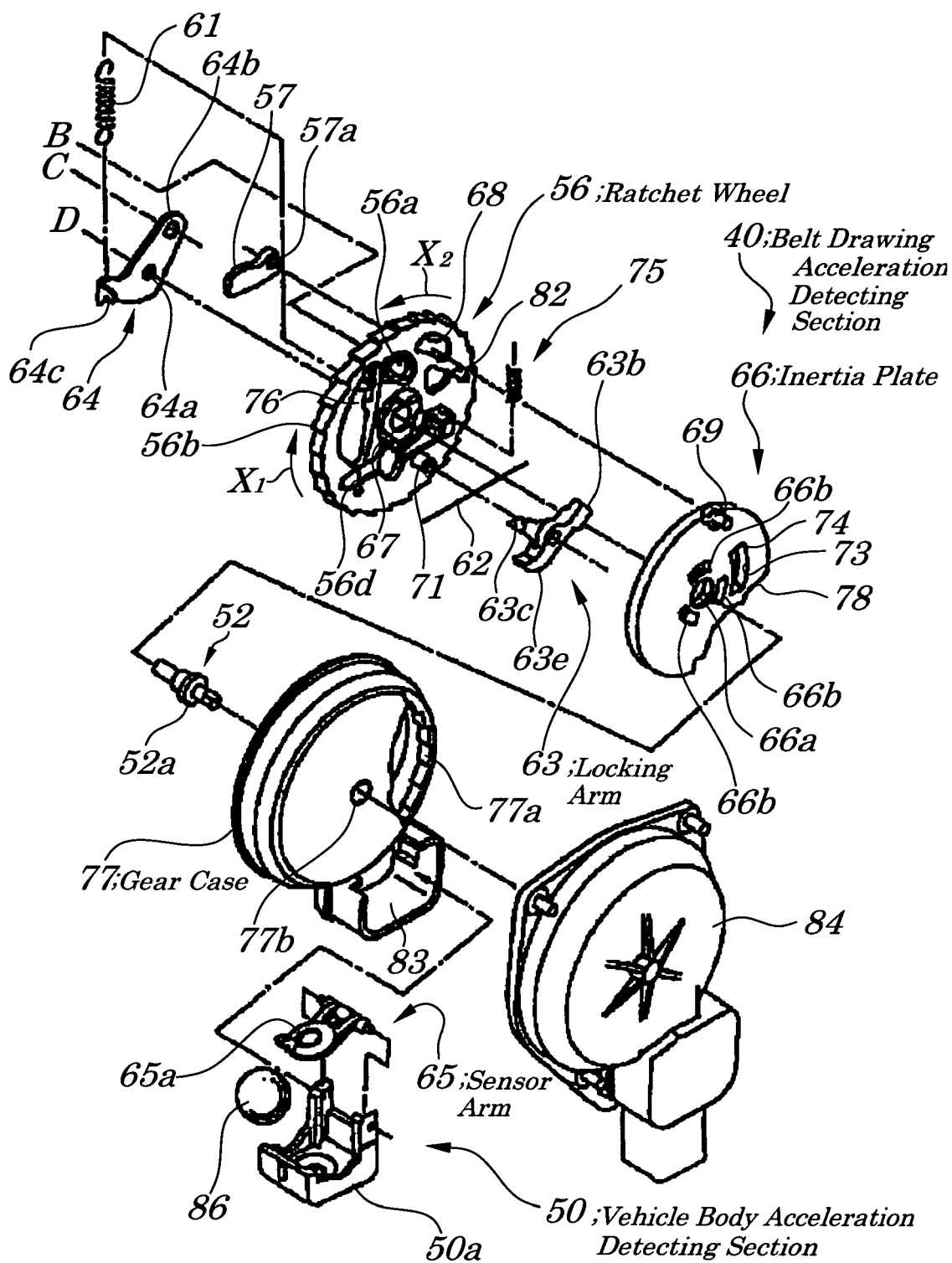
FIG. 8 is an expanded perspective view showing another part of the configurations of the above belt retractor.
Figure 9:
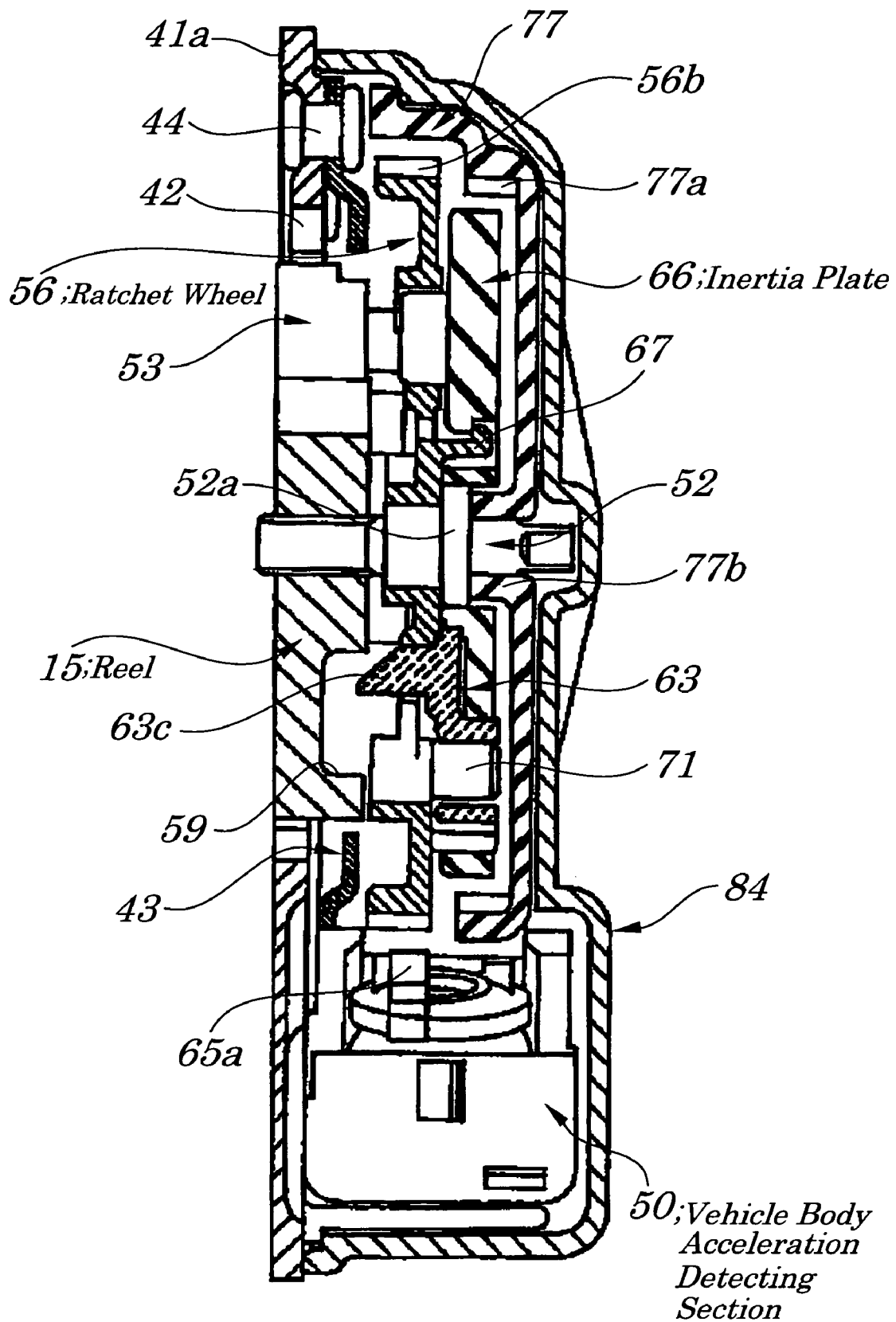
FIG. 9 is a cross-sectional view showing configurations of a belt locking mechanism of the seat belt device.
Figure 10:
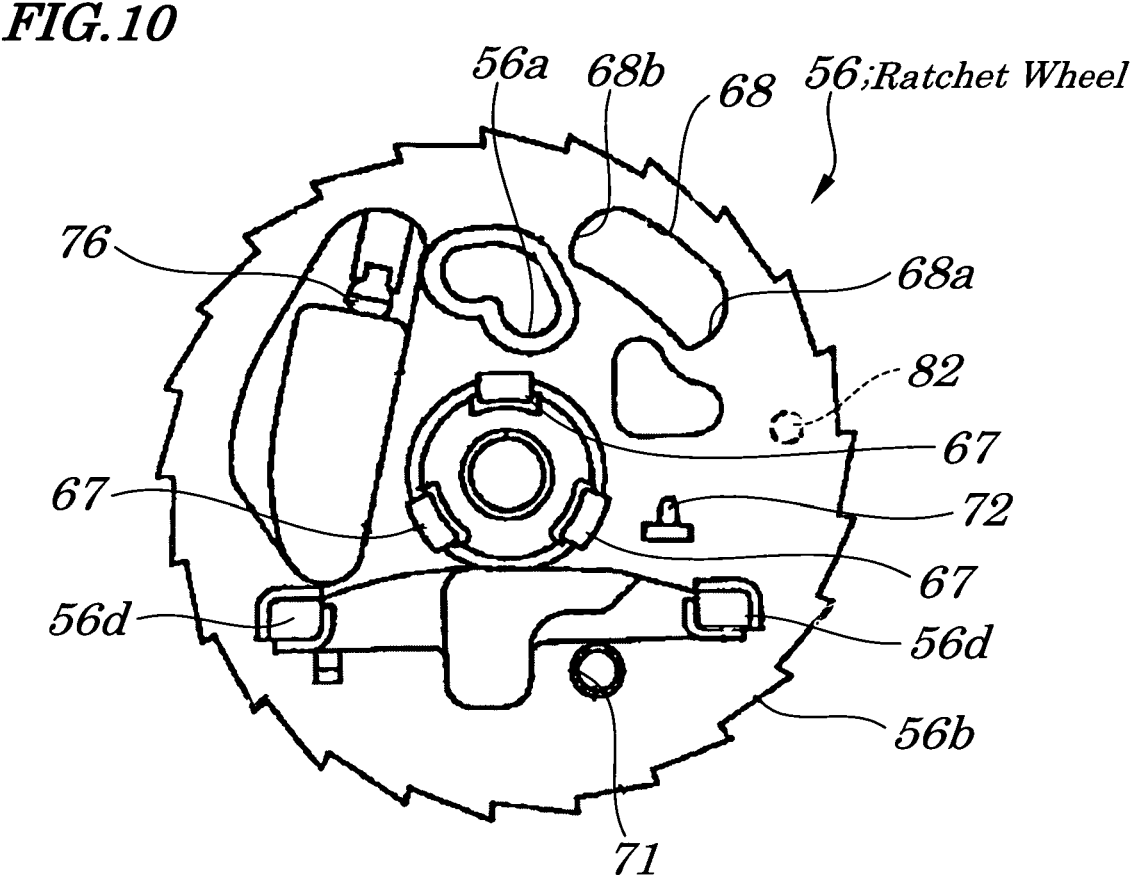
FIG. 10 is a diagram explaining a ratchet wheel of the above belt locking mechanism.
Figure 11:
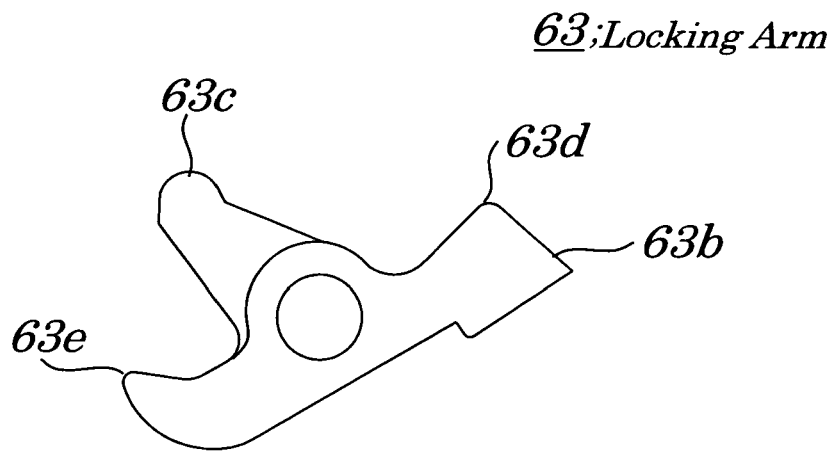
FIG. 11 is a diagram showing configurations of a locking arm of the above belt locking mechanism.
Figure 12:
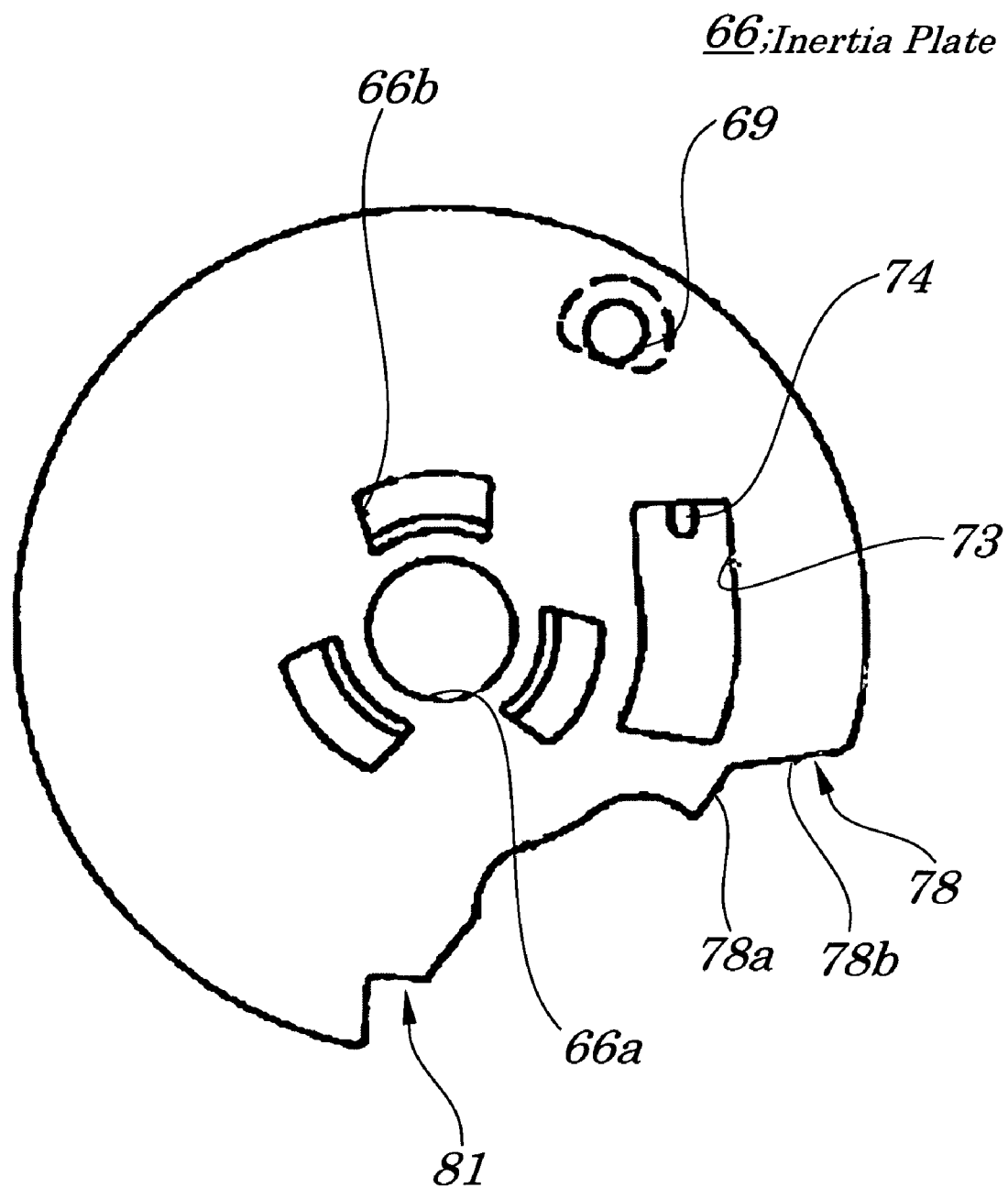
FIG. 12 is a diagram showing configurations of an inertia plate of the above belt locking mechanism.
Figure 13:
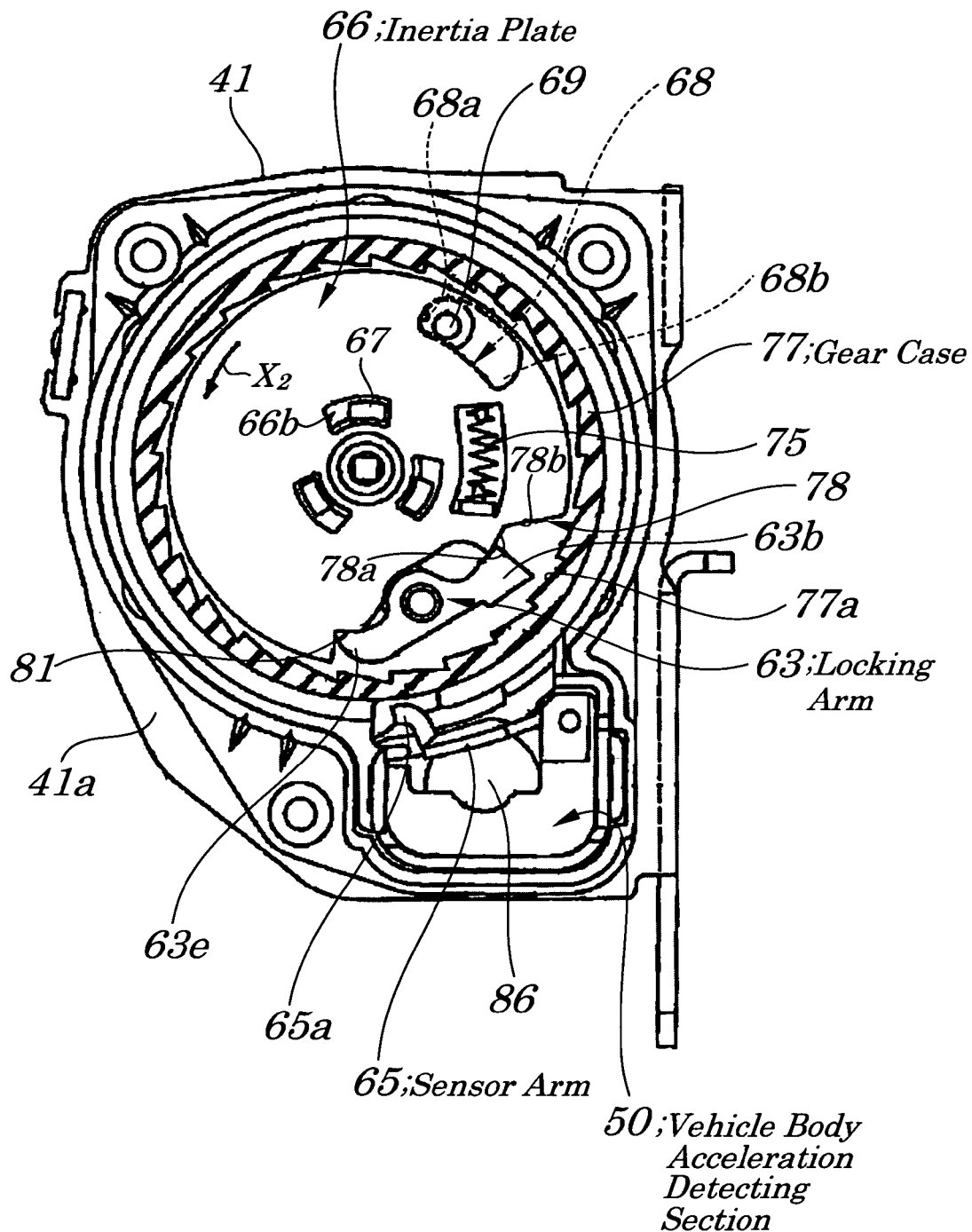
FIGS. 13 to 15 are diagrams explaining operations of the belt locking mechanism.
Figure 14:
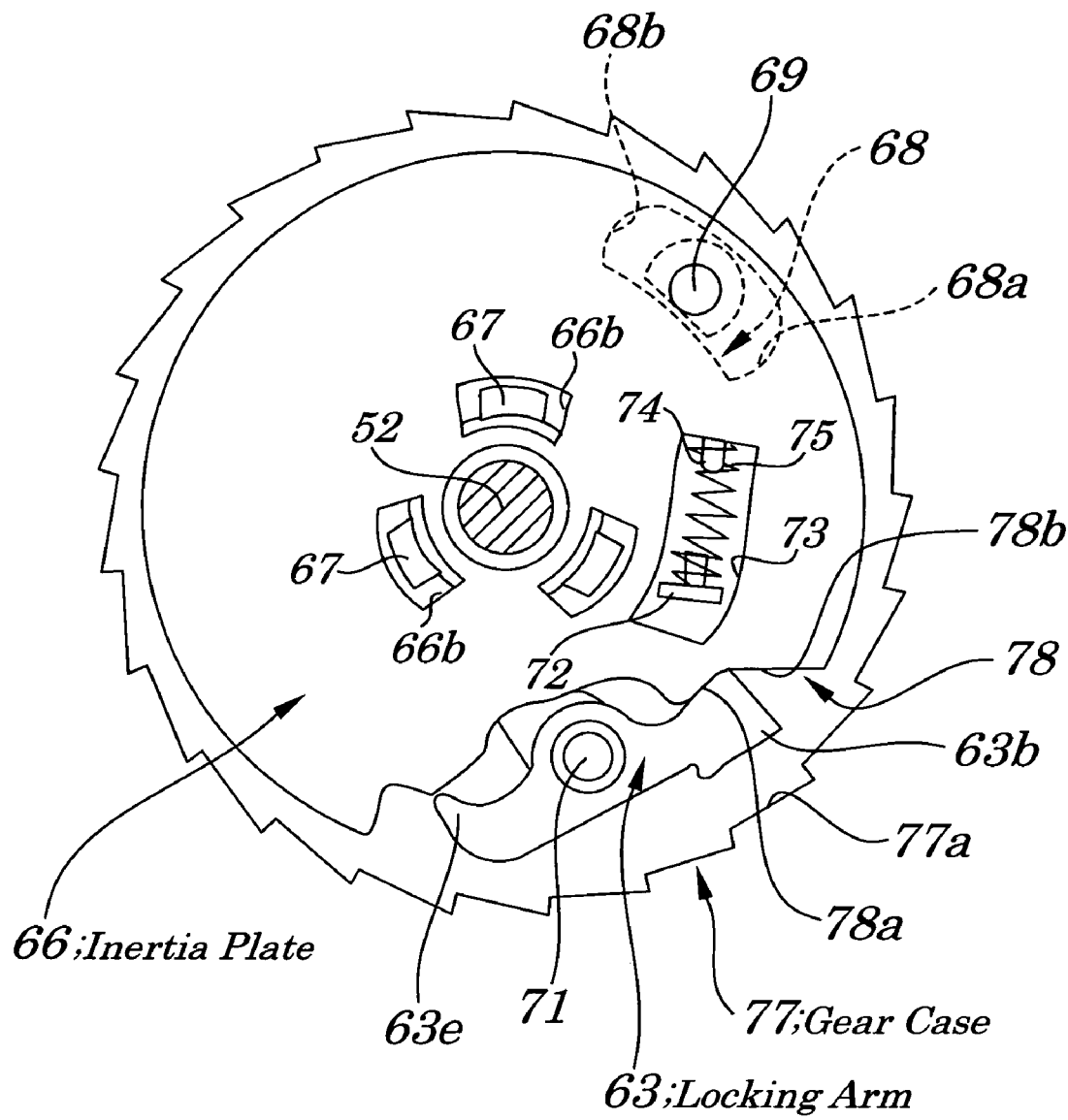
Figure 15:
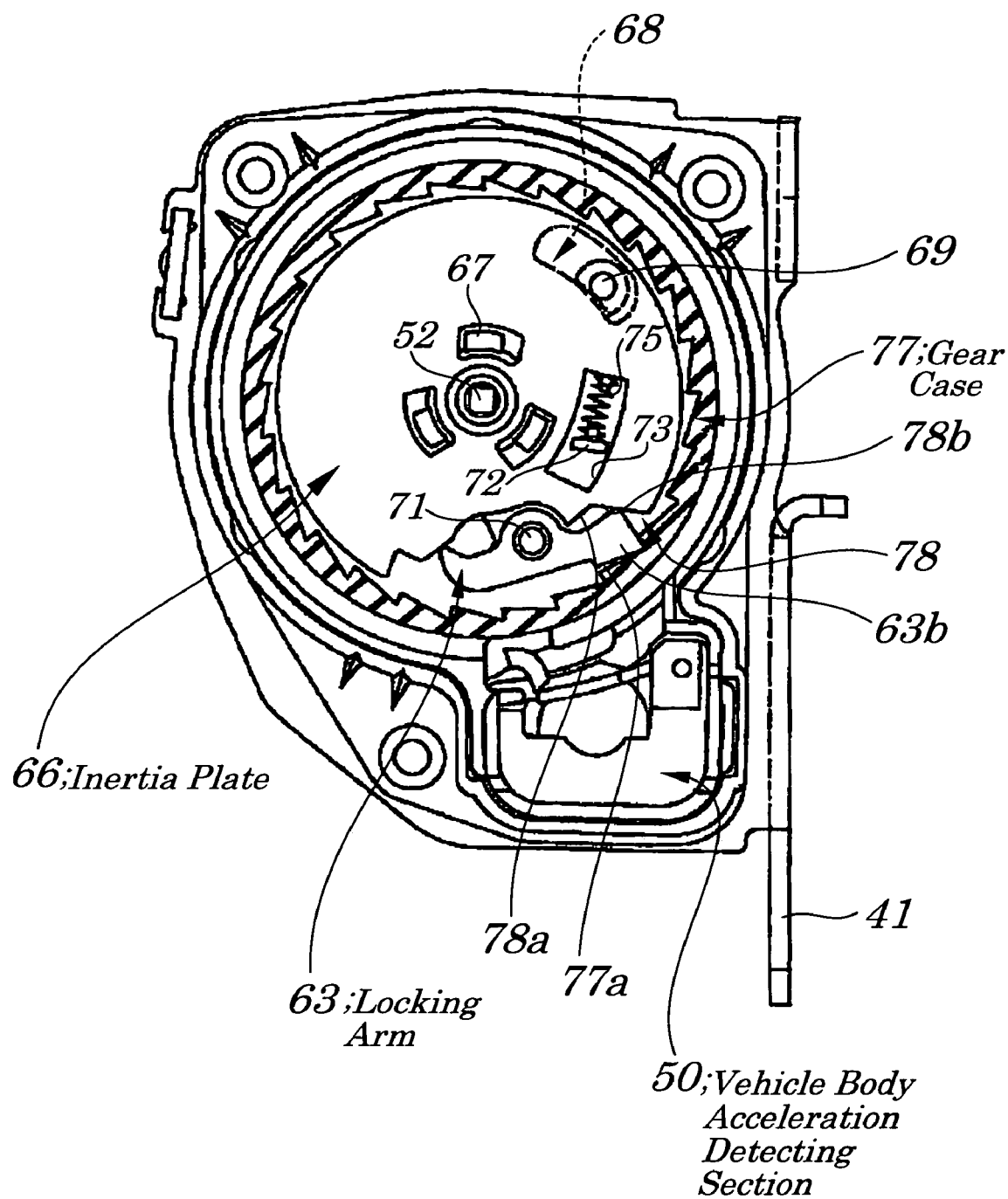

FIG. 7 is an exploded perspective view partially showing configurations of a belt retractor 4. FIG. 8 is an exploded perspective view showing configurations of another portion of the belt retractor 4. FIG. 9 is a cross-sectional view showing configurations of a belt locking mechanism 17 of the seat belt device 1. FIG. 10 is a diagram explaining configurations of the ratchet wheel 56 of the belt locking mechanism 17. FIG. 11 is a diagram showing configurations of a locking arm 63 of the belt locking mechanism 17. FIG. 12 is a diagram showing a locking arm 63 of the belt locking mechanism 17. FIGS. 13 to 15 are diagrams explaining operations of the belt locking mechanism 17.

As shown in FIG. 7, the retractor base 41 is ⊐-shaped and reeling-shaft through-holes are formed in its side plates 41a and 41b facing each other and the reel 15 serving as a reeling shaft around which the seat belt 3 is wound is put between reeling-shaft through-holes in a state in which a shaft of the reel 15 is inserted into the reeling-shaft through-hole and in a manner to be supported by the shaft and to rotate freely.

Moreover, an associated internal tooth 42 of the reeling-shaft through-hole formed in the side plate 41a is formed in an inner edge of the reeling-shaft through-hole and a ring member 43 is placed on an outside of the reeling-shaft through-hole. Drawing process is performed in the ring member 43 along its inner edge and, when the ring member 43 is fixed by rivets 44 to an outside face of the side place 41a, an axial clearance between the associated internal tooth 42 and the inner edge of the reeling-shaft through-hole appears.

On a side of the side plate of the retractor base 41 is placed a belt locking mechanism 17 used to inhibit drawing of the seat belt 3 in case of emergency. Moreover, on a side of the side plate of the retractor base 41 is placed a power transfer unit 47 including a pulley 19, reeling spring 46, potentiometer 23, or a like being connected to the shaft (corresponding to the reel shaft 16) 45 to be driven by the motor 12 via the power transfer belt 21.

The reel 15 is an approximately cylindrical-shaped reeling shaft integrally formed by aluminum alloy or a like. In the drum portion of the reeling shaft 48 around which the seat belt 3 is wound is placed a slit-shaped aperture 48a which penetrates the reeling shaft 48 in a direct-diameter direction for keeping an end of the seat belt 3 being inserted and maintained therein. Moreover, in an outer edge of the reel 15 is attached a flange member 49 formed by an another material to prevent winding perturbation of the seat belt 3.

Furthermore, a position for drawing and inserting of the seat belt 3 being wound around an outer edge of the reel 15 attached to the retractor base 41 is controlled by the passage of the seat belt 3 through a seat belt guide 51 placed in an upper portion on a rear plate of the retractor base 41.

On both sides of the reel 15 is placed a rotational supporting shaft in an protruded state and in a manner to rotate freely and, as shown in FIG. 8, on an end side of a sensor of the reel 15 is inserted, by pressure, a supporting shaft pin 52 configured as a separate body to serve as the rotational supporting shaft.

In an end face on the sensor side of the reel 15 is attached, as shown in FIG. 7, a supporting shaft 54 in a manner to be protruded which supports, by a shaft, a pawl 53 serving as a locking member being able to be attached to a connecting inner tooth 42 formed on a side plate.

Also, when the pawl 53 rotates in an oscillating manner in a direction of being connected to the associated inner tooth 42, positioning of an end on the oscillating side of the pawl 53 and a rear end section 53e of the pawl 53 placed on an opposite side is made and, a pressure receiving section 55 to receive pressure when a large load is imposed between the pawl 53 and the connecting inner tooth 42 is placed at an end on the sensor side of the reel 15.

Moreover, at an end on a side of the sensor of the reel 15 is placed a stopping protruded section 58 used to control the rotation of the oscillating lever member 57 attached to the ratchet wheel 56 in an oscillating manner serving as a latching member of the locking operating means in a counterclockwise direction.

The concave section 59 is a relief used to prevent interference among a tension coil spring 61 to give momentum to rotation in a direction (direction shown as an arrow X2 in FIG. 8) in which the seat belt 3 of the ratchet wheel 56 is drawn, an arm section 63c of the locking arm 63 configured to press a sensor spring 62 described above, and the reel 15.

At an oscillating end of the pawl 53 being able to be connected in a manner to correspond to the connecting inner tooth 42 formed on the side plate 41a is integrally formed a connecting tooth 53c. Also, a shaft hole 53a being fitted, in a manner to have play, in the supporting shaft 54 penetrates a center portion of the pawl 53 and a connecting protruded section 53b being positioned on the oscillating side and a pressure protrusion 53d positioned on the rear end of the pawl 53 are placed on a side of the sensor of the pawl 53.

That is, since the shaft hole 53a is attached to the supporting shaft 54 in a manner to have play, the pawl 53 is supported by the supporting shaft 54 in a state in which the pawl 53 can rotate in an oscillating manner and can move relatively by a specified amount. To a stop hole 64b being a through hole of a holding plate 64 which the supporting pin 52 inserted by the reel 53 penetrates is connected an end of the supporting shaft 54 in a state in which the end is crimped and the holding plate 64 prevents the pawl 53 from coming up from an end of the reel 15.

Also, an end of the connecting protruded section 53b of the pawl 53 is inserted into a cum hole 56a placed outside the holding plate 64 and formed in the ratchet wheel 56 supported by the supporting pin 52 in a manner to rotate freely.

Here, when the ratchet wheel 56 rotates in a direction (direction shown by an arrow X1 in FIG. 8) in which the seat belt 3 relative to a position of the reel 15 is reeled, the cum hole 56a acts so as to move an end of the connecting protruded section 53b outside in a radius direction from the rotational center of the reel 15, the pawl 53 is made to rotate around the supporting shaft 54 toward a direction (direction shown by the arrow Y1 in FIG. 7) in which the connecting inner tooth 42 formed in the side plate 1a is connected.

That is, the locking means is so configured that the pawl 53 is made to rotate, in a oscillating manner, in a direction in which the connecting internal tooth 42 is connected and the connecting tooth 53c is coupled to the connecting tooth 42, thus inhibiting rotation of the reel 15.

The ratchet wheel 56, as shown in FIGS. 8 and 9, is a ratchet whose central hole is supported by a supporting shaft pin 52 in a manner to rotate freely and in a portion surrounding the ratchet is formed a ratchet tooth 56b to be connected to a sensor arm 65 of a vehicle body acceleration detecting section 50.

Also, a flange section 52a of the supporting shaft pin 52 is configured to support a central hole 66a of an inertia plate 66 being a discoidal-shaped inertial member that makes up a belt drawing acceleration detecting section 40 serving as an inertia detecting means used to detect a drawing acceleration of the seat belt 3. The stopping nail section 67 formed in an edge of a central hole of the ratchet wheel 56 toward an outside of the belt retractor 4 performs positioning in a thrust direction of the inertia plate 66 in a manner to be connected to a connecting hole 66b.

To a long hole 68 formed on the ratchet wheel 56 is connected a connecting extruded section 69 of the inertia plate 66 and one end of the edge 68a of the long hole 68 performs positioning processing in a rotational direction of the inertia plate 66 at the time when the belt locking mechanism 21 is not working (see FIG. 10).

On an outer side of the ratchet wheel 56 are formed a shaft section 71 to support the locking arm 63 so as to be rotated freely and a spring hook section 72 in a manner to be protruded. In the inertia plate 66, as shown in FIG. 12 and FIG. 14, an aperture 73 through which the spring hook section 72 is to be inserted is formed.

In the aperture 73 is formed the inertia plate 66 in a long hole state in which the inertia plate 66 is able to rotate relatively to the ratchet wheel 56 and at one of ends of the inertia plate 66 is placed a spring hook section 74 corresponding to the spring hook section 72.

Into these pairs of the spring hook sections 72 and 74 are inserted a compressed coil spring 75 in a fitted manner. The compressed coil spring 75, as shown in FIG. 13, serves to give moment so that a state (that is, non-locked state) in which the connecting extruded portion 69 of the inertia plate 66 contacts another end edge of the long hole 68 formed in the ratchet wheel 56 in a straightly-struck manner is maintained.

In an inner face side of the ratchet wheel 56 is formed a spring stopping section 76 used to stop another end of the tension coil spring 61 whose one end is connected to a stopping section 64c of the holding plate 64 and the tension coil spring 61 gives moment to the rotation of the reel 15 in a direction in which the seat belt 3 of the ratchet wheel 56 is drawn.

The locking arm 63 includes, as shown in FIG. 11, a connecting coil 63b that can be engaged with an inertia tooth gear 77a of a gear case 77 and the arm section 63c that pushes, by pressure, a longitudinal-direction central portion of the sensor spring 62 both sides of which are supported by a pair of hook sections 56d mounted on an outer side of the ratchet wheel 56.

Here, the locking arm 63 makes up a connecting member in which a connecting nail 63d engages with the inner tooth gear 77a to stop rotation in a direction in which the seat belt 3 of the ratchet wheel 56 is drawn. The connecting nail 63b is pushed, by momentum power of the sensor spring 62, to the straightly-struck contacting section 78 of the inertia plate 66.

Moreover, an aperture is formed in the ratchet wheel 56 corresponding to an oscillation range of the arm section 63c and the arm section 63c penetrates the aperture, which ensures connection between the arm section 63c and the sensor spring 62.

The straightly-struck contacting section 78 is so constructed that a first cum face 78a along which a rear portion 63d of the connecting nail 63d of the locking nail 63b of the locking arm 63 slides and in which the rotation of the inertia plate 66 does not affect operations of the locking arm 63 and a second cum face 78b that oscillates the locking arm 63 so that the connecting nail 63d engages with the inertia tooth gear 77a depending on a delay in the rotation of the inertia plate 56 relative to the rotation of the reel 15.

When the belt locking mechanism 21 is in a non-locked state, the first cum face 78a contacts the rear portion 63d of the locking arm 63 and, until the delay in the rotation of the inertia plate 66 relative to the rotation of the reel 18 exceeds a predetermined amount, the rear portion 63d of the locking arm 63 does not contact, in a straightly-struck manner, the second cum face 78b.

A length (that is, an amount of the rotation of the inertia plate 66 with the rear portion 66d being in contact with the first cum face 68a in a sliding manner) of the first cum face 68a is set at a degree to which, even if a delay in the rotation occurs due to inertia force that acts the inertia plate 66 when a total amount of the seat belt 3 is housed, the rear portion 63d of the locking cum 63 does not reach the second cum face 78b by such the delay in the rotation.

Moreover, in the locking arm 63 of the embodiment, a straightly-struck contacted nail 63e is formed at the oscillating end being opposite to the connecting nail 63d. A step portion 81 with which the straightly-struck contacted nail 63e can be in contact is formed in the inertia plate 66 in a straightly-struck contacted manner so as to correspond to the straightly-struck contacted nail 63e.

The step portion 81, when the inertia plate 66 is in a non-locking state and in an initial position, the rotation of the locking arm 63 is controlled in a locking direction by a straightly-struck contact of the straightly-struck contacted nail 63e.

As shown in FIGS. 14 and 15, if an amount of rotational delay exceeding a predetermined amount occurs in the inertia plate 66 and if the rear portion 63d of the locking arm 63 comes in contact with the second cum face 78b, by pressure-pushed action, the locking arm 63 can be oscillated in a locking direction.

Additionally, the oscillating lever member 57 whose shaft hole 57a is supported by the shaft is placed on the supporting shaft 82 being protruded in an inner side face of the ratchet wheel 56. The oscillating lever member 57 is put between the reel 15 and the ratchet wheel 56 so that the counterclockwise rotation is controlled, when necessary, by the connecting protruded portion 58 placed at an end surface on the sensor side of the reel 15 and so that the clockwise rotation is controlled, whenever necessary, by mounting the pressure-pushed protruded portion 53d placed on the sensor side of the pawl 53 in an protruded manner is put between the supporting shaft 82 and the stopping extruded portion 58.

Moreover, in a central portion of the gear case 77 placed on an outer side of the inertia plate 66 is placed a shaft supporting section 77a and, at the bottom face of a shaft supporting section 77b, a flange section 52a of the supporting pin 52 is in contact in a straightly-struck contacted manner and is used as a face for positioning in a shaft line direction of the reel 15. Also, in a lower portion of the gear case 77 is formed a box-shaped section 83 that houses a vehicle body acceleration detecting section 50 serving as an inertia detecting means to detect acceleration of a vehicle body. Furthermore, on an outer side of the side plate used to cover the gear case 77 is placed a sensor cover 89, as shown in FIG. 8.

Figure 16:
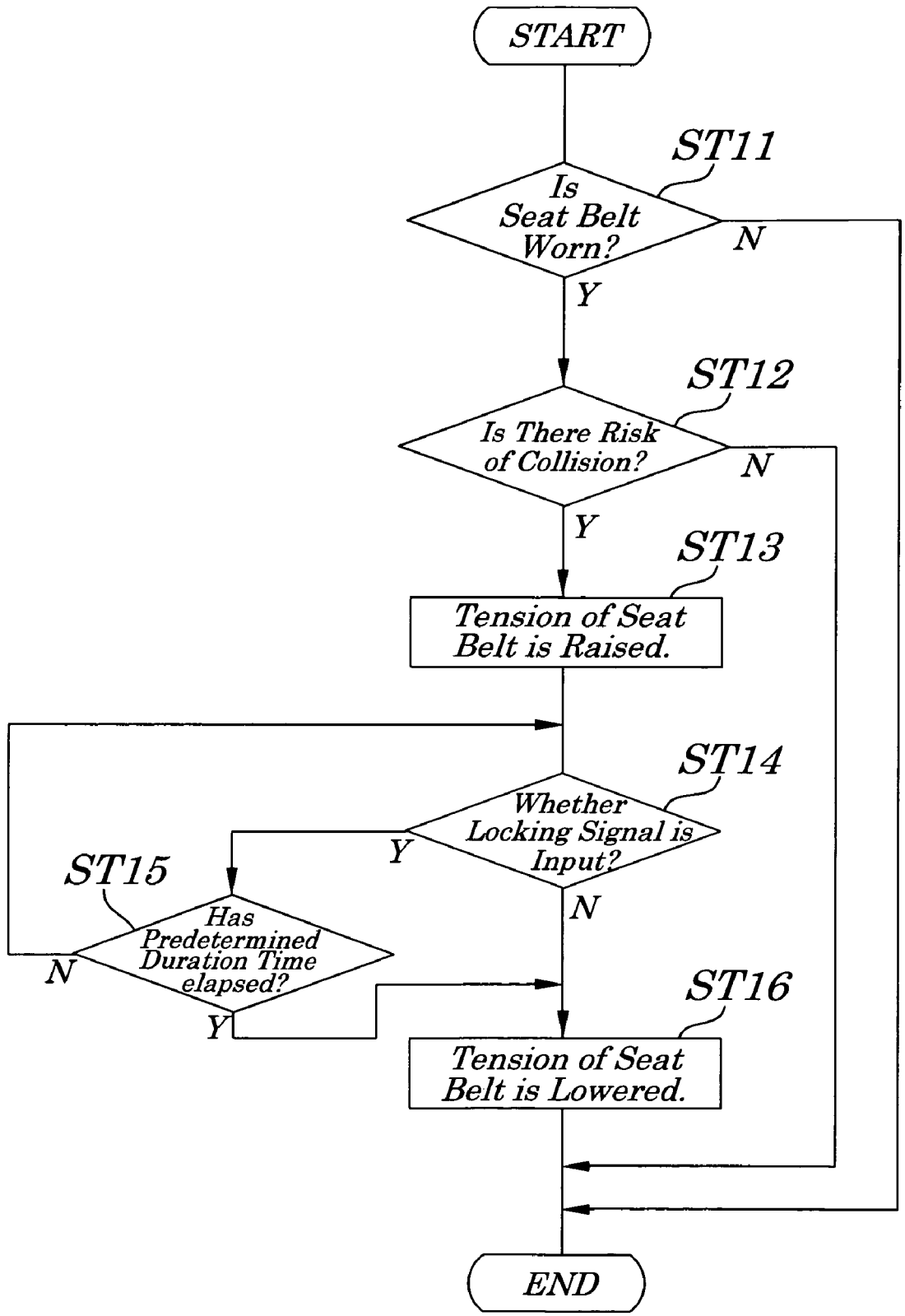
FIG. 16 is a flowchart explaining operations of the above seat belt device.
Figure 17:
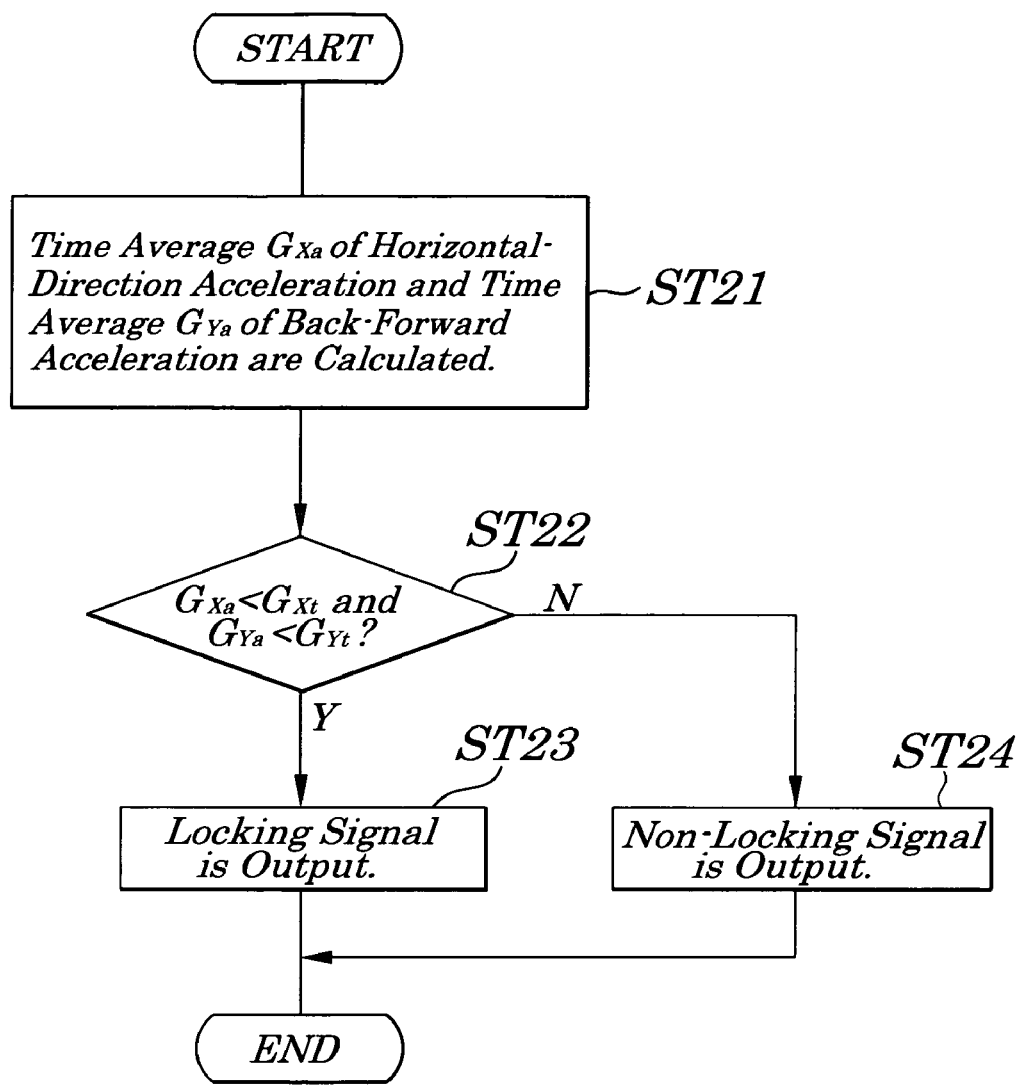
FIG. 17 is a flowchart explaining operations of the above locking signal producing section.

FIG. 16 is a flowchart explaining operations of the seat belt device 1. FIG. 17 is a flowchart explaining operations of the locking signal producing section 18.

Next, operations of the seat belt device 1 of the embodiment are described by referring to FIGS. 16 and 17.

The main controlling section 24, by executing a main program, periodically monitors a wearing flag of the seat belt 3 (Step ST 11, FIG. 16). In Step ST11, when the seat belt wearing flag is in an OFF state, the process is terminated as it is and, when the seat belt wearing flag is in an ON state, the routine proceeds to Step ST12 and the main controlling section 24 judges whether or not there is a risk of collision or whether necessity of collision avoidance operations exists according to setting of the collision risk flag.

In Step ST12, when the collision risk flag is in an OFF state, the routine is terminated as it is and, when the collision risk flag is in an ON state, the routine proceeds to Step ST13 and the motor driving circuit 28 is controlled and the motor 12 is made to rotate and to be driven and the seat belt 3 is reeled to raise tension. This enables removal of looseness of the seat belt 3 to some extent.

In Step ST14, when the tension of the seat belt 3 reaches a predetermined level, the main controlling section 24 periodically monitors the locking flag. The controlling section 24 judges whether or not a locking signal (or non-locking signal) is input according to setting or non-setting of the locking flag.

Moreover, the tension of the seat belt 3 is judged by reading a sample value written in a current value area in the RAM 25b of the storing section 25.

If the locking flag is in an OFF state, the routine proceeds to Step ST16 and, if the locking detecting flag is in an ON state, the routine proceeds to Step ST15 and the main controlling section 24 checks time elapsed after the tension of the seat belt 3 has reached a predetermined level while continuing reeling operations of the seat belt 3 and judges whether a predetermined duration time has elapsed or not. When the predetermined duration time has not yet been reached, the routine is returned back to Step ST14 and, when the predetermined duration time has elapsed, the routine proceeds to Step ST16 That is, the process in the Step ST15 is executed until a locking signal is not input.

In Step ST15, for example, the belt locking mechanism 17 is in a lockable state and the rotation of the ratchet wheel 56 in a direction of drawing the seat belt 3 is inhibited.

However, while the seat belt 3 is reeled by the motor 12 and the reel 15 is rotating in a reeling direction, the connecting protruded section 53b of the pawl 53 and the inner tooth 42 of the side plate 41a are kept in a non-connected state.

In Step ST16, the main controlling section 24 provides an instruction for decelerating the motor 12 to the output interface 27. This causes a decrease in currents to be fed from the motor driving circuit 28 to the motor 12 and reductions in driving force of the motor 12, thus lowering tension of the seat belt 3. Moreover, by reversing the rotation of the motor 12, the reduction in driving force may be achieved.

Here, even if the judgement is made that a locking signal is not input after a rise of the tension in the Step ST13, that is, even if the tension of the seat belt 3 is raised by outputting of an erroneous collision risk signal, by the process of this Step ST16, the process of immediate control of lowering the tension of the seat belt 3 is performed and, therefore, it is possible to avoid occurrence of giving an unpleasant feeling to a vehicle occupant A caused by needless restraining.

Also, when the tension of the seat belt 3 is lowered in this Step ST16 after the predetermined duration time has elapsed in the Step ST15, it is possible to avoid the occurrence of giving the unpleasant feeling to the vehicle occupant A caused by the comparatively long continuation of the state in which the tension of the seat belt 3 is high when a locking signal is input, for example, along the steep sloping road. Also, the degradation of the motor 12 can be prevented. After that, when the tension of the seat belt 3 is lowered to a value occurring before the rise in the tension of the seat belt 3 and the main controlling section 24 provides an instruction for stopping the motor 12 to the output interface 27. This causes stopping of a supply of currents from the motor driving circuit 28 to the motor 12 and the motor 12 is stopped.

Next, operations of the locking signal producing section 18 are described by referring to FIG. 17.

First, the detection controlling section 29, in the Step ST21, receives information about acceleration from the horizontal-direction acceleration sensor 34 and back-forward direction acceleration sensor 35 and calculates absolute values |Gx| and |Gy| of the acceleration Gx and Gy based on the acceleration Gx and Gy and then obtains time averages Gxa and Gya for a predetermined time (for example, 2 ms) of absolute values |Gx| and |Gy| of the acceleration Gx and Gy.

Next, in the Step ST22, a locking signal non-detected signal or a locking signal is output based on threshold values Gxt and Gyt of acceleration set in advance. That is, the detection controlling section 29, when Gxa<Gxt and Gya<Gyt, the routine proceeds to Step ST23 and a locking signal is output and, in the case other than this, the routine proceeds to Step ST 24 and non-locking signal is output. The detection controlling section 29 terminates the process after having output a locking-signal non-detected signal or a locking signal. Moreover, in the embodiment, the threshold values Gxt and Gyt of acceleration are predetermined according to operating conditions of the vehicle body acceleration detecting section 50.

According to this example, even if a collision risk signal is output erroneously from the collision risk judging section 11, unless a locking signal is output from the locking signal producing section 18, control is exerted so that the tension of the seat belt 3 is immediately lowered and, therefore, it is possible to avoid occurrence of giving an unpleasant feeling to the vehicle occupant A caused by needless restraining for a comparatively long time.

Moreover, even if a locking signal is output from the locking signal producing section 18, reeling of the seat belt 3 is continued for a predetermined duration time for reeling by the motor 12 even after the tension of the seat belt 3 reaches a predetermined tension and, therefore, when a non-locking signal is output within the reeling continuous time, even if the tension of the seat belt 3 is lowered, drawing of the seat belt 3 is not locked. As a result, it is possible to prevent the occurrence of giving an unpleasant feeling to the vehicle occupant A caused by restraining of the vehicle occupant A occurring when the seat belt 3 is again reeled to release the drawing locking.

Moreover, unlike in the case of the conventional technology in which the reeling continuation time is set at fixed time including the time at which a condition for locking of drawing is met and, during the fixed time, the driving operation for reeling is continued, in this embodiment, so long as the locking signal is being output from the locking signal producing section 18, the driving operation for the reeling by the motor 12 is continued and, therefore, needless rise in the tension of the seat belt 3 can be prevented and wasteful restraining time can be saved.

Also, by stopping the driving operation for reeling to lower the tension of the seat belt 3 after the predetermined reeling continuation time has elapsed, for example, a lockable state occurs in a long steep sloping road and, when the locking signal is output, a state in which the tension of the seat belt 3 is high continues comparatively long, thus preventing occurrence of giving an unpleasant feeling to the vehicle occupant A. Also, it is possible to prevent breakage and/or degradation of the motor 12 caused by a rise in temperatures by long operation for reeling and to achieve a long life.

Second Embodiment

Figure 18:
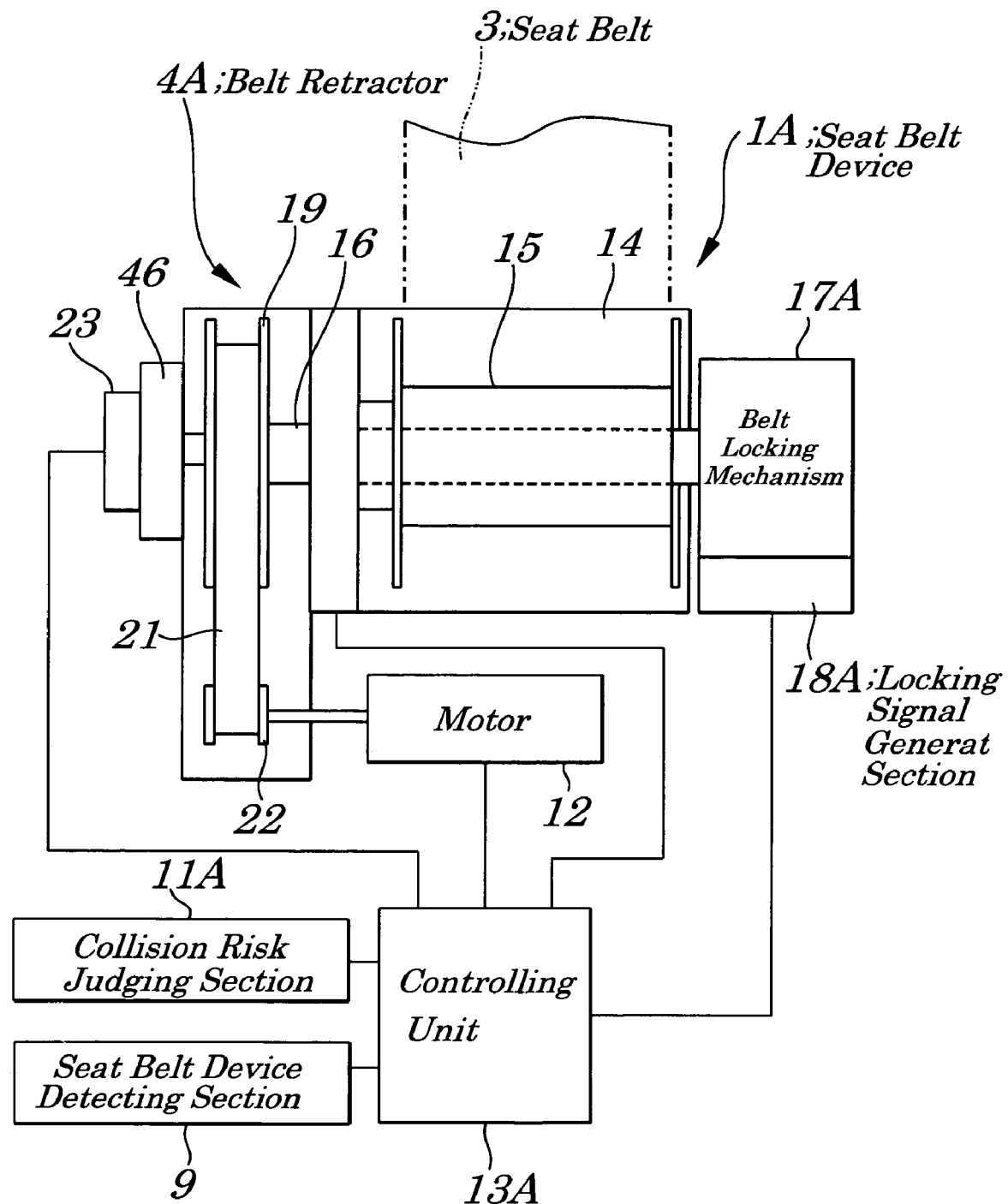
FIG. 18 is a diagram showing configurations of a belt retractor of a seat belt device of a second embodiment of the present invention.
Figure 19:
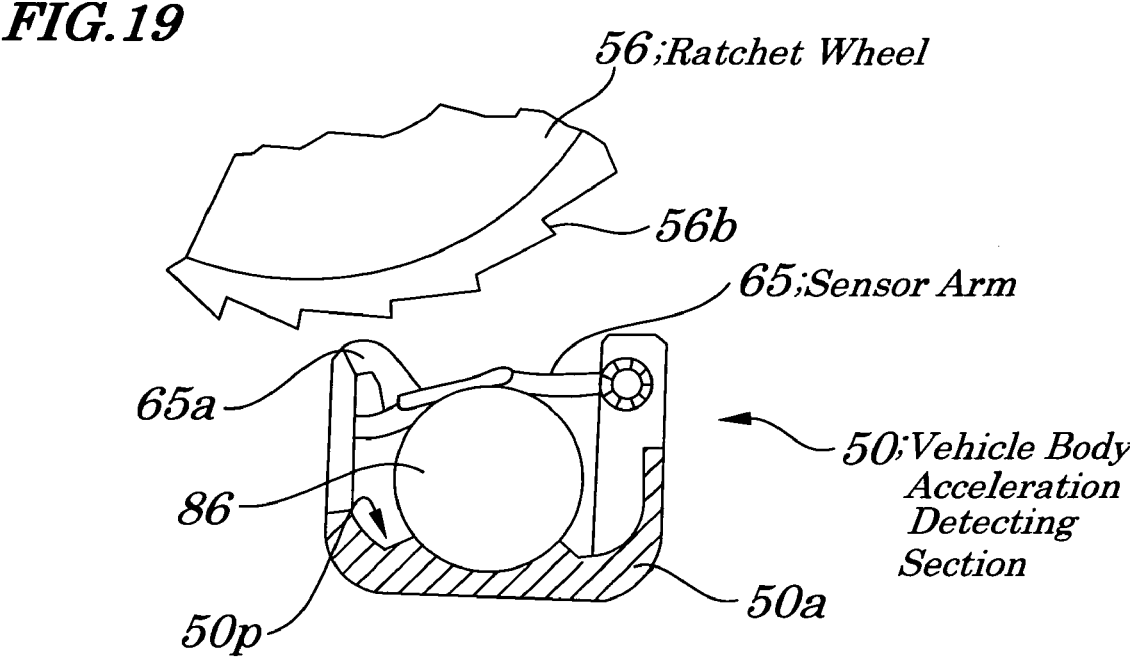
FIG. 19 is a diagram explaining configurations of a vehicle acceleration detecting section and a locking signal producing section making up the belt retractor and showing a state in which the belt retractor is not locked.
Figure 20:
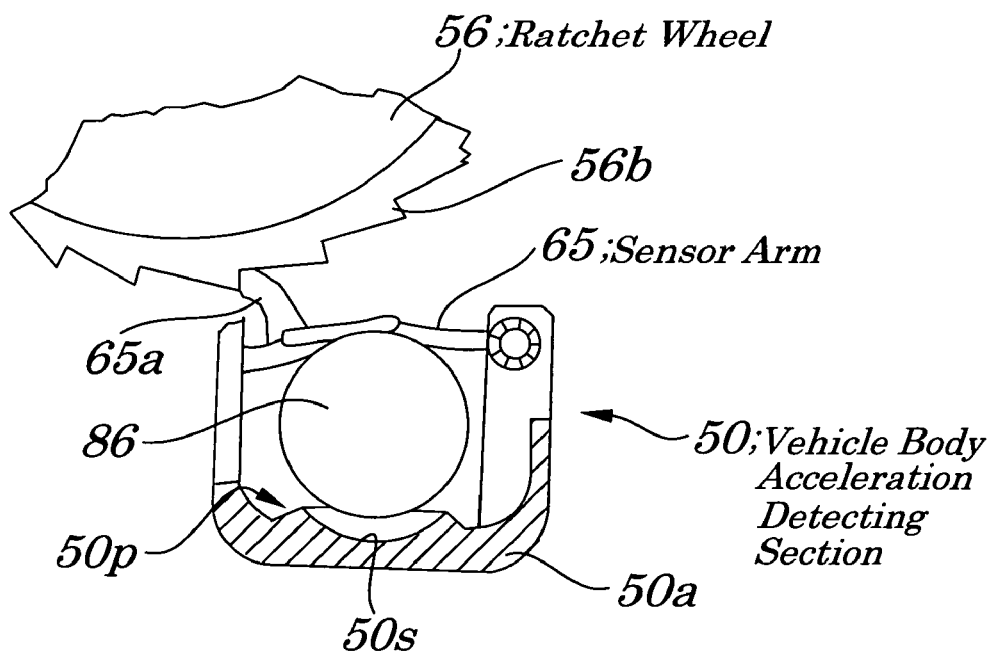
FIG. 20 is a diagram explaining configurations of the vehicle body acceleration detecting section and the locking signal producing section making up the belt retractor and showing a state in which the belt retractor is locked.
Figure 21:
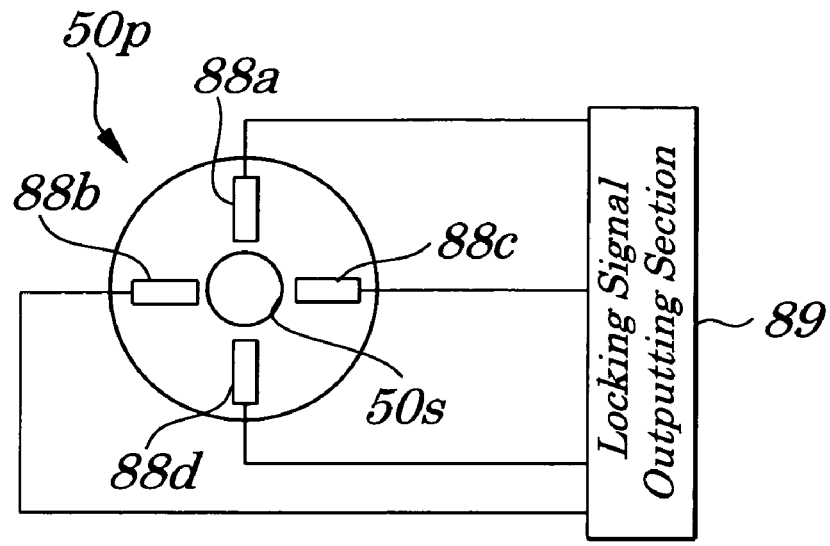
FIG. 21 is a diagram explaining configurations of the locking signal producing section.
Figure 22:
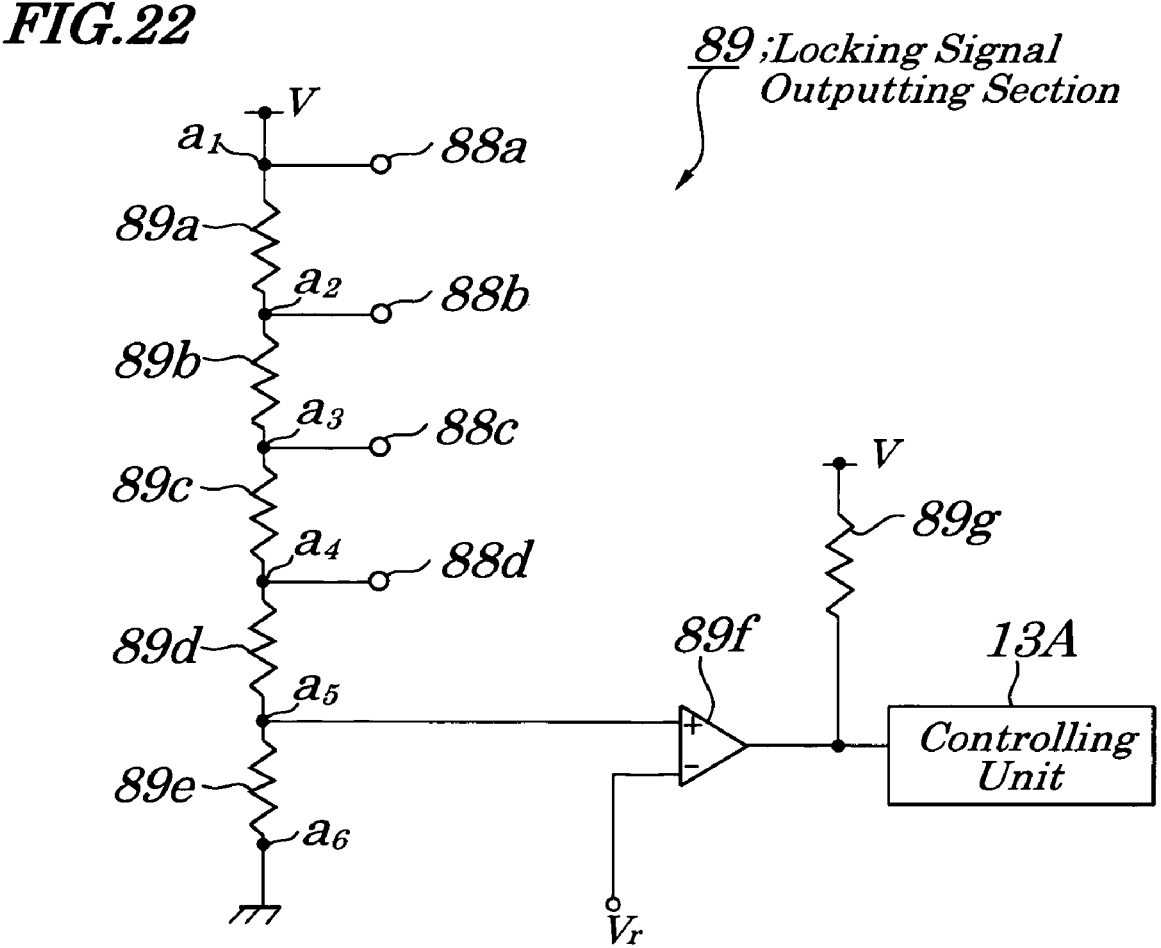
FIG. 22 is a circuit diagram showing configurations of a locking signal outputting section of the locking signal producing section.

FIG. 18 is a diagram showing configurations of a belt retractor of a seat belt device of the second embodiment. FIG. 19 is a diagram explaining configurations of a vehicle body acceleration detecting section and a locking signal producing section making up the seat belt device being in a non-locked state. FIG. 20 is a diagram explaining configurations of the vehicle body acceleration detecting section and a locking signal producing section making up the seat belt device being in a locked state. FIG. 21 is a diagram explaining configurations of the locking signal producing section. FIG. 22 is a circuit diagram showing configurations of the locking signal producing section and locking signal outputting section.

The seat belt device of the second embodiment differs from that of the first embodiment in that, unlike in the case of the first embodiment in which a main controlling section judges whether or not the tension is lowered based on a locking signal output from the locking signal producing section mounted separately from a belt locking mechanism, a locking signal showing a start of a locking mechanism is output from the vehicle body acceleration detecting section making up a locking mechanism. Configurations other than above are the same as those in the first embodiment and their descriptions are omitted accordingly.

The seat belt device 1A of the second embodiment, as shown in FIG. 18, includes a controlling unit 13A to control a motor (belt adjusting unit) 12 used to reel a seat belt 3 or a like, a reel 15 to wind the seat belt 3 around a frame 14, a reel shaft (restraining limiting means) 16 whose left end portion is connected to the reel 15 and serving as a central shaft for rotation of the reel 15 is mounted in a manner to rotate freely and a belt locking mechanism 17A (belt locking mechanism) mounted at a right end of the reel shaft 16 to lock drawing of the seat belt 3.

Moreover, to the controlling unit 13A is connected the locking signal producing section 18A that produces a locking signal and supplies the produced signal when locking of drawing the seat belt 3 is detected by the belt locking mechanism 17A.

Here, a sensor cover 50a and ball weight 86 also serves as composing elements of the vehicle body acceleration detecting section 50.

The locking signal producing section 18A of the second embodiment, as shown in FIG. 19 to FIG. 21, has the ball weight 86 made of a conductor being held by the ball holding action 59 formed at the bottom of the sensor cover 50a, four electrode pieces 88a, 88b, 88c, and 88d, and locking signal outputting section 89.

In the locking signal outputting section 89, as shown in FIG. 22, five resistors 89a to 89e are connected in series in this order and one terminal a1 of the resistor 89a is connected a power supply, one terminal a6 of the resistor 89e is connected to aground and to a connecting point a5 between the resistor 89d and resistor 89e is connected a non-inverted input terminal of a comparator 89f.

Here, the one terminal a1 of the resistor 89a, a connecting point a2 between the resistor 89a and the resistor 89b and a connecting point a4 between the resistor 89c and the resistor 89d are connected respectively to the electrode pieces 88a, 88b, 88c, and 88d.

Also, to an inverted input terminal of the comparator 89f is applied a reference voltage Vr. In the embodiment, Vr=(5/12) RV ("V" is supply power). Moreover, an output terminal of the comparator 89f is connected to a power supply through a resistor 89g and to the controlling unit 13A.

Next, operations of the seat belt device 1A of the embodiment are described by referring to FIG. 19 to FIG. 22.

In a normal state (for example, in the case where a vehicle acceleration including deceleration is a predetermined value or less), the ball weight 86 is placed on a volcano-shaped ball holding groove formed in the ball holding section 50p in a safe manner and all the electrodes 88a, 88b, 88c, and 88d are intact with the ball weight 86. Therefore, all the electrodes 68a, 88b, 88c, and 88d are shorted and "H (high)" level signal (non-locking signal) is output from the output terminal of the comparator 89f. At this point, as shown in FIG. 19, a stopping protrusion 65a does not engage with a ratchet tooth 56b of a ratchet wheel 56.

Momentum is given to the ratchet wheel 56 by momentum power of a tension coil spring being put, in a hung manner, between a spring hung stopping section 76 and a spring peg section 64, to a direction of drawing the seat belt relative to the reel 15 and momentum is given to the pawl 53 in which a connecting protrusion 53b is connected to a cum hole 56a, in a direction of being not connected to a connecting internal tooth 42. As a result, the reel 15 can be rotated and the seat belt 3 can be retracted freely.

When vehicle acceleration (including deceleration) exceeds a predetermined value, the ball weight 86, as shown in FIG. 20, is displaced in the ball holding section 50p and is run on an edge of a ball holding groove 50s and is pushed upward in the drawing and, out of electrodes 88a, 88b, 88c, and 88d, for example, the electrode piece 88d is separated from the ball weight 86. Therefore, from an output terminal of the comparator 89f is output an "L" level signal (locking signal). When the ball weight 86 is pushed up, a sensor arm 65 moves upward in the drawing and the connecting protrusion 65a engages with the ratchet tooth 56b of the ratchet wheel 56.

Due to this, the rotation in a direction of drawing the seat belt of the ratchet wheel 56 can be inhibited. However, when the seat belt 3 is reeled by the motor 12 and the reel 15 rotates in a reeling direction, the connecting protrusion 53b of the pawl 53 is kept in a state in which the connecting protrusion 53b is not connected to the internal tooth 42 of the side plate 41a.

Thus, a locking signal is supplied to the controlling unit 13A from the locking signal outputting section 89 depending on a locking state and non-locking state of the belt locking mechanism 17A. As described in the first embodiment, the controlling unit 13A exerts control of the tension of the seat belt 3 according to existence or non-existence of inputting of the locking signal (non-locking signal). According to configurations of the embodiment, approximately the same effect obtained in the above first embodiment can be achieved in the second embodiment.

Third Embodiment

Figure 23:
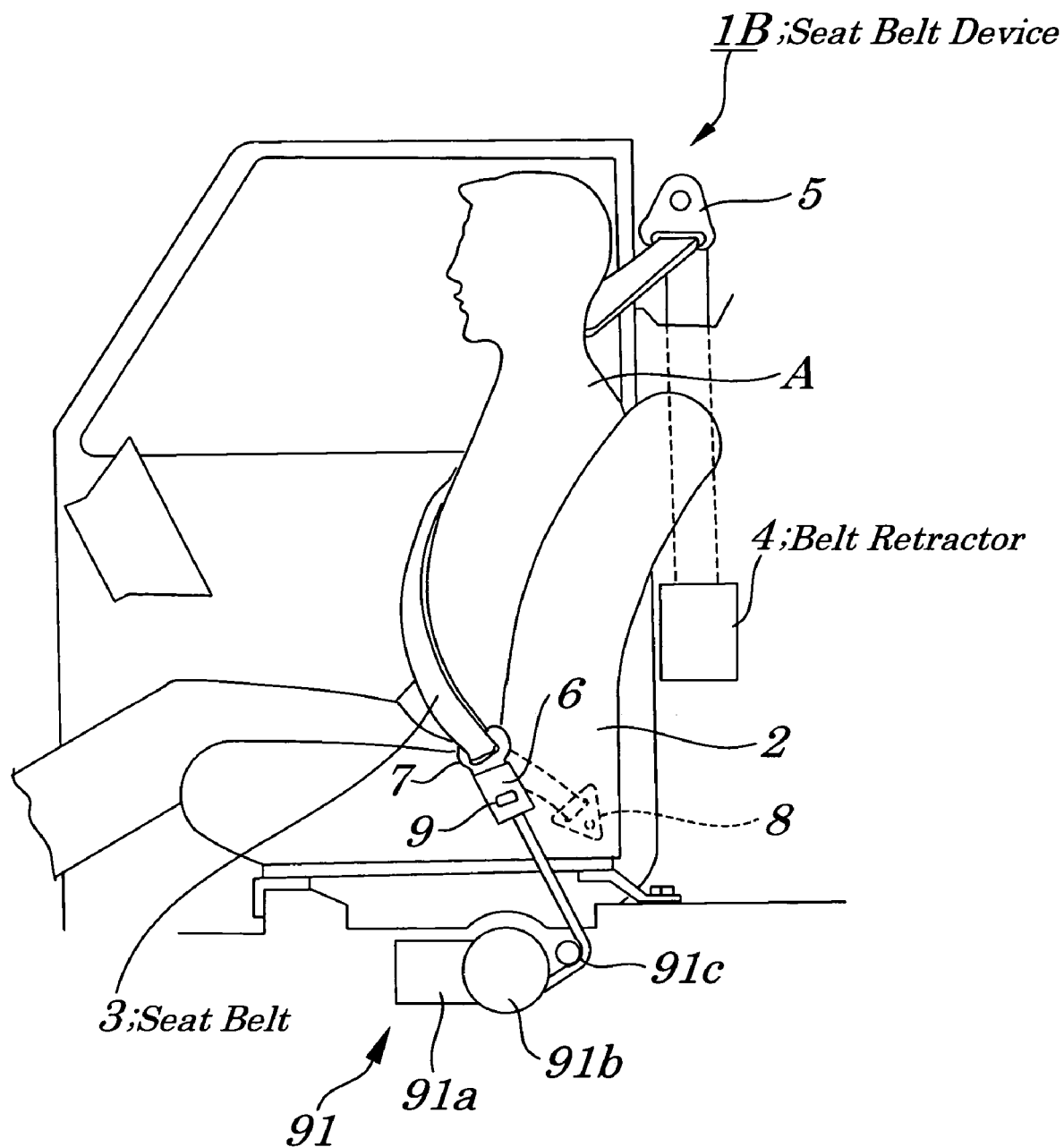
FIG. 23 is a diagram explaining configurations of a seat belt device of a third embodiment of the present invention.

FIG. 23 is a diagram explaining configurations of a seat belt device of a third embodiment of the present invention. Configurations of the seat belt device 1B of the third embodiment differ from those of a seat belt device of the first embodiment in that an electric transmission winch is placed which serves as a belt adjusting unit to draw in or retract the seat belt toward a side of a buckle. Configurations of the seat belt device of the third embodiment other than above are the same as those of the first embodiment and their descriptions are omitted.

The seat belt device (vehicle occupant restraining and protecting apparatus) 1B of the third embodiment, as shown in FIG. 23, includes an electric transmission winch 91, as the means for drawing in or out the seat belt 3 toward a side of the buckle 6, which has a motor 91a and a reel 91b to reel a wire 91c directly connected to the buckle 6. Normal and reverse rotation of the motor 91a enables the wire 91c to be drawn out and retracted.

The controlling section 28, instead of driving the motor 15, drives the motor 01a of the electric transmission winch 91 to remove looseness of the seat belt 3. In this case, it is also possible to estimate a tension of the seat belt 3 by detecting a current value of the motor 91a.

Thus, according to the third embodiment, approximately the same effects as obtained in the first embodiment can be also achieved. Additionally, since a length of a drawn-out portion of the seat belt 3 is decreased more compared with the case in which an end of the seat belt 3 is fixed to a vehicle body, looseness of the seat belt 3 can be promptly removed.

Fourth Embodiment

Figure 24:
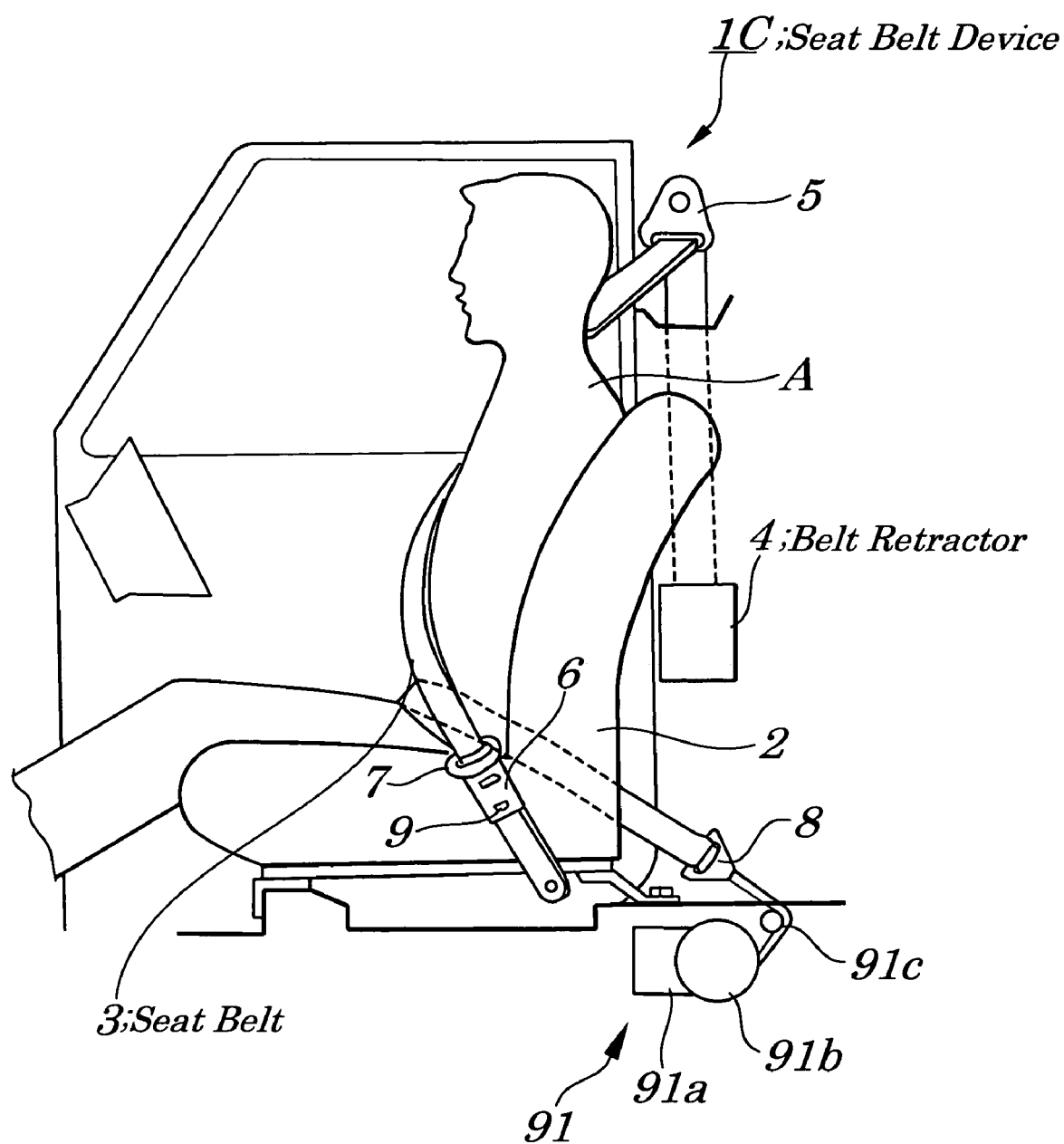
FIG. 24 is a diagram explaining configurations of a seat belt device of a fourth embodiment of the present invention.

FIG. 24 is a diagram explaining configurations of a seat belt device of a fourth embodiment of the present invention.

Configurations of the fourth embodiment differ from those of the third embodiment in that an electric transmission winch serving as a belt adjusting unit is placed on a side of an anchor to which an end of the seat belt is fixed. Configurations of the seat belt device of the fourth embodiment other than above are the same as those of the third embodiment and their descriptions are omitted. In the seat belt (vehicle occupant restraining and protecting apparatus) 1C of the fourth embodiment, as shown in FIG. 24, the electric transmission winch 91 serving as an adjusting means for removing looseness of the seat belt is placed on a side of the anchor (lapping belt fixing portion) to which an end of the seat belt 3 is fixed.

Thus, according to the fourth embodiment, approximately the same effect as obtained in the first embodiment can be also achieved.

It is apparent that the present invention is not limited to the above embodiments but may be changed and modified without departing from the scope and spirit of the invention. For example, in the above embodiment, to lower tension of the seat belt, driving force of a motor 12 is decrease, however, the motor 12 may be stopped or rotated in a reverse direction.

Also, in the above embodiment, the motor 12 is used as a means for adjusting the seat belt, however, a spring can be employed as a power source. Also, a belt adjusting unit may be attached to a belt retractor 4 or to a place other than that of the belt retractor 4. In this case, the belt adjusting unit may be placed, for example, on a buckle or on a lapping belt fixed section. Also, for example, a controlling section 24 has also a function of judging a risk of collision or a like of a collision risk judging section 11.

Also, in the collision risk judging section 11, detection of operations of avoiding collision including the rapid operation of a brake and of a handle may be made based on information about acceleration fed from a horizontal-direction acceleration sensor 34 and a forward-back acceleration sensor 35. Also, the belt retractor 4 may be placed not in the lower portion of a center pillar of a vehicle but on a seat.

Also, in the first embodiment, in a locking signal producing section 18, the locking signal may be output to a controlling unit based on acceleration of drawing the seat belt 3 in addition to vehicle body acceleration.

In the second embodiment, the locking signal is output to the controlling section 13A in synchronization with operations of the vehicle body acceleration detecting section 50. In addition to this, a locking signal may be output to the controlling unit in synchronization with operations of the belt drawing acceleration detecting section 40.

Figure 25:
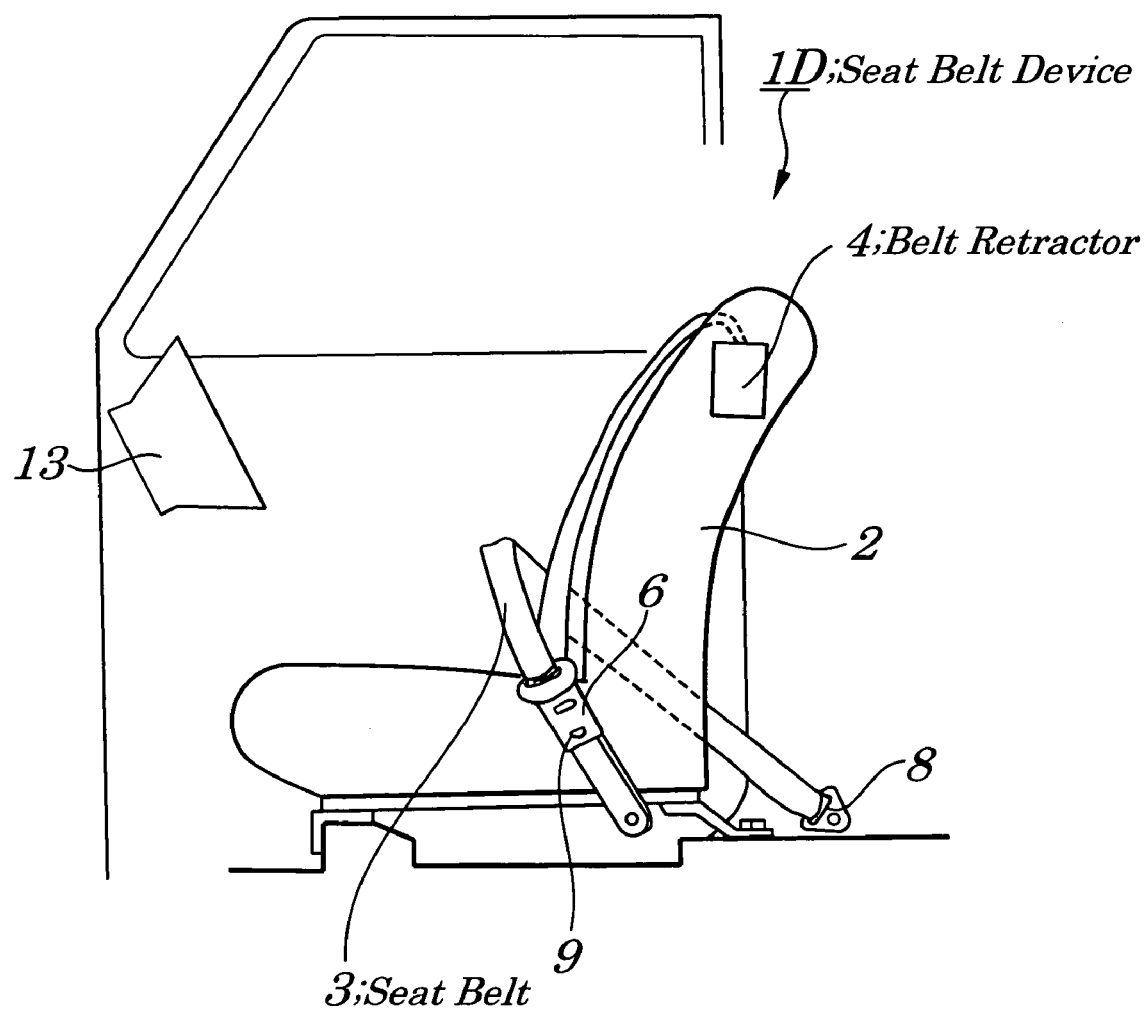
FIG. 25 is a diagram explaining configurations of a modified example of the seat belt device of the third embodiment of the present invention.

Moreover, in the above third and fourth embodiments, wire may be drawn in by a torsion bar driven by the motor in a rotational manner and a nut on which a reciprocating movement on this torsion bar is made to be used as a tension variable means. Furthermore, as shown in FIG. 25, the belt retractor 4 of a belt retractor 1D may be attached not in the lower portion of a center pillar of a vehicle but on the seat.

INDUSTRIAL APPLICABILITY

The present invention can be applied to a vehicle that moves on a road at high speed.

What is claimed is:

1. A restraining and protecting apparatus for a vehicle occupant comprising:
    a seat belt to restrain a vehicle occupant on a seat;
    a belt adjusting unit to adjust a tensile state in which said vehicle occupant is restrained using said seat belt by increasing or decreasing said seat belt to be drawn out in length;
    a belt locking mechanism to prevent said seat belt from being drawn out by locking said seat belt;
    an immediately-before-collision signal producing section to produce and output an immediately-before-collision signal immediately before occurrence of a collision of said vehicle;
    a locking signal producing section to produce and output a locking signal when it is predicted at least that said belt locking mechanism is in a lockable state where inhibition of drawing out is made possible when said seat belt is going to be drawn out;
    a controlling section to control said belt adjusting unit based on said immediately-before-collision signal to be input and said locking signal to be input; and
    wherein said controlling section exerts control in a manner that, when the immediately-before-collision signal is input, said belt adjusting unit increases said tensile state in which said vehicle occupant is restrained using said seat belt and that, when said locking signal is not input, said belt adjusting unit weakens said tensile state in which said vehicle occupant is restrained using said seat belt.

2. The restraining and protecting apparatus for a vehicle occupant according to claim 1,
    wherein said belt locking mechanism in said lockable state, when said belt adjusting unit is controlled by said controlling section so as to increase said tensile state in which said vehicle occupant is restrained using said seat belt, is put in a state of releasing locking in which said seat belt is able to be drawn out.

3. The restraining and protecting apparatus for a vehicle occupant according to claim 1,
    wherein said controlling section exerts control so that, while said locking signal is input, said belt adjusting unit increases and maintains said tensile state in which said vehicle occupant is restrained using said seat belt.

4. The restraining and protecting apparatus for a vehicle occupant according to claim 3,
    wherein said controlling section exerts control so that said belt adjusting unit, when a predetermined time has elapsed after said locking signal has been input, weakens said tensile state in which said vehicle occupant is restrained using said seat belt.

5. The restraining and protecting apparatus for a vehicle occupant according to claim 1,
    wherein said controlling section exerts control when said immediately-before-collision signal is input so that said belt adjusting unit increases said tensile state in which said vehicle occupant is restrained using said seat belt and that said belt adjusting unit, when said tensile state in which said vehicle occupant is restrained using said seat belt comes to a tensile state in which said vehicle occupant is restrained to a predetermined extent and when said locking signal is not input, weakens said tensile state in which said vehicle occupant is restrained using said seat belt.

6. The restraining and protecting apparatus for a vehicle occupant according to claim 1,
    wherein said locking signal producing section outputs said locking signal when at least part of conditions under which drawing of said seat belt is inhibited by said belt locking mechanism is met.

7. The restraining and protecting apparatus for a vehicle occupant according to claim 6, wherein said seat belt is locked under a condition that acceleration in a back-and-forth or lateral direction of said vehicle exceeds a predetermined value.

8. The restraining and protecting apparatus for a vehicle occupant according to claim 6, wherein said seat belt is locked under a condition that acceleration at which said seat belt is drawn out exceeds a predetermined value.

9. The restraining and protecting apparatus for a vehicle occupant according to claim 7, wherein said acceleration includes acceleration in a direction being reverse to a direction of a velocity of said vehicle.

10. The restraining and protecting apparatus for a vehicle occupant according to claim 1, wherein said locking signal producing section, when a state in which said belt locking mechanism is in a lockable state is detected, outputs said locking signal.

11. The restraining and protecting apparatus for a vehicle occupant according to claim 1, wherein said belt adjusting unit includes a motor to retract said seat belt and wherein said controlling section, where said immediately-before-collision signal is input, controls said motor to increase its driving power and to increase said tensile state in which said vehicle occupant is restrained using said seat belt and exerts control so that, said belt adjusting unit, when said locking signal is not input, weakens said tensile state in which said vehicle occupant is restrained using said seat belt.

12. The restraining and protecting apparatus for a vehicle occupant according to claim 11,
    wherein said controlling section, while said locking signal is input, controls said motor serving as said belt adjusting unit so as to have said seat belt retracted.

13. The restraining and protecting apparatus for a vehicle occupant according to claim 1, wherein said immediately-before-collision signal producing section, based on a detection signal obtained from a non-contact type distance sensor, calculates a speed of said vehicle relative to an obstruction existing in a front of said vehicle and, based on a result from calculation, judges as to whether there is a possibility of occurrence of collision between said vehicle and said obstruction and also judges, when there is a possibility of collision, as to whether said avoidance of collision is possible or not.

14. The restraining and protecting apparatus for a vehicle occupant according to claim 1, wherein said immediately-before-collision signal producing section, when a detection of an operation for collision avoidance is made, outputs said immediately-before-collision signal.

15. The restraining and protecting apparatus for a vehicle occupant according to claim 14, wherein said immediately-before-collision signal producing section outputs said immediately-before-collision signal when detection of a rapid brake operation or a rapid handle operation for collision avoidance is made by being recognized that acceleration in a back-and-forth or lateral direction of said vehicle exceeds a predetermined value.

* * * * *